(12) United States Patent
Kobayashi et al.

(10) Patent No.: US 7,512,643 B2
(45) Date of Patent: Mar. 31, 2009

(54) COMPUTER SYSTEM FOR MANAGING BACKUP OF STORAGE APPARATUS AND BACKUP METHOD OF THE COMPUTER SYSTEM

(75) Inventors: Ikuko Kobayashi, Kawasaki (JP); Shinji Kimura, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 265 days.

(21) Appl. No.: 11/487,991

(22) Filed: Jul. 18, 2006

(65) Prior Publication Data
US 2007/0282929 A1    Dec. 6, 2007

(30) Foreign Application Priority Data
May 31, 2006    (JP)    ............... 2006-150868

(51) Int. Cl.
G06F 17/30    (2006.01)
G06F 12/00    (2006.01)
G06F 7/00    (2006.01)

(52) U.S. Cl. ............... 707/204; 707/203
(58) Field of Classification Search ............. 707/204, 707/203
See application file for complete search history.

(56) References Cited

U.S. PATENT DOCUMENTS

| | | | | |
|---|---|---|---|---|
| 6,237,008 | B1* | 5/2001 | Beal et al. | 707/204 |
| 2003/0088592 | A1* | 5/2003 | Innan et al. | 707/204 |
| 2003/0182329 | A1* | 9/2003 | Sato | 707/204 |
| 2004/0078399 | A1* | 4/2004 | Tabuchi et al. | 707/204 |
| 2004/0193660 | A1* | 9/2004 | Gagne et al. | 707/204 |
| 2004/0210608 | A1* | 10/2004 | Lee et al. | 707/204 |
| 2004/0225697 | A1* | 11/2004 | Asano et al. | 707/204 |
| 2004/0254964 | A1* | 12/2004 | Kodama et al. | 707/204 |
| 2004/0260736 | A1* | 12/2004 | Kern et al. | 707/204 |
| 2005/0076070 | A1* | 4/2005 | Mikami | 707/204 |
| 2005/0086443 | A1 | 4/2005 | Mizuno et al. | |
| 2005/0125465 | A1* | 6/2005 | Arakawa et al. | 707/204 |
| 2005/0203972 | A1* | 9/2005 | Cochran et al. | 707/204 |
| 2005/0203973 | A1* | 9/2005 | Yagawa | 707/204 |

OTHER PUBLICATIONS

Bhattacharya, Suparna, Coordinating backup/recovery and data consistency between database and file systems, 2002, ACM, ISBN: 1-58113-497-5.*

* cited by examiner

Primary Examiner—Kuen S Lu
Assistant Examiner—Jermaine Mincey
(74) Attorney, Agent, or Firm—Antonelli, Terry, Stout & Kraus, LLP.

(57) ABSTRACT

For a computer system that includes a storage system and a management computer, the storage system includes a first storage area, for storing data used by a computer connected to the storage system, and a second storage area, for storing a duplicate of the data included in the first storage area. The management computer includes first management information, for managing the frequency at which the data in the first storage area are copied. When the management computer receives a notification indicating the first storage area has been unmounted from another computer, the management computer employs the first management information for determining whether the data in the first storage area should be copied. Then, when the data should be copied, the first storage area is mounted on the computer and the data in the first storage area are copied to the second storage area.

6 Claims, 17 Drawing Sheets

FIG. 6

| TARGET ID 6001 | OWNER INFORMATION 6002 | TARGET INFORMATION (IP ADDRESS, TARGET NAME, INITIATOR NAME) 6003 | PRIMARY LU STATUS 6004 | SECONDARY LU STATUS 6005 | PC INFORMATION 6006 |
|---|---|---|---|---|---|
| #1 | 10000001 | 10213.34.100,target.1000.001,initiator.100.001 | MOUNTED ON PC | UNMOUNTED | xxx.xxx.xxx.1 |
| #2 | 10000001 | 10213.34.100,target.1000.002,initiator.100.002 | MOUNTED ON SERVER | UNMOUNTED | xxx.xxx.xxx.2 |
| --- | --- | --- | --- | --- | --- |

| TARGET ID 8001 | DEVICE ID 8002 | PRIMARY LU NUMBER 8003 | SECONDARY LU NUMBER 8004 | EXECUTION DATE AND TIME 8005 |
|---|---|---|---|---|
| #1 | 192.168.10.1,target-backup.1000.000 | 100 | 300 | 2006.04.12,01:10 |
| #2 | 192.168.10.1,target-backup.1000.000 | 101 | 301 | 2006.04.12,01:20 |
| --- | --- | --- | --- | --- |

8000

| TARGET ID | BACKUP METHOD | BACKUP FREQUENCY |
|---|---|---|
| #1 | VOLUME REPLICATION | ONCE A WEEK |
| #2 | SNAPSHOT COPY | ONCE A DAY |
| ⋮ | ⋮ | ⋮ |
| #N | VOLUME REPLICATION | ONCE A WEEK |

| TARGET ID | SECONDARY COPY METHOD | GROUP IDENTIFIER |
|---|---|---|
| #1 | VOLUME REPLICATION | G1 |
| #2 | REMOTE VOLUME REPLICATION | G2 |
| #3 | VOLUME REPLICATION | G3 |
| ⋮ | ⋮ | ⋮ |

FIG. 14

| GROUP IDENTIFIER 1401 | PRIMARY PROCESS 1402 | SECONDARY PROCESS 1403 | COPY DESTINATION DEVICE ID 1404 | RAID GROUP 1405 | PRIMARY PROCESS DATE AND TIME 1406 | SECONDARY PROCESS DATE AND TIME 1407 |
|---|---|---|---|---|---|---|
| G1 | ONCE A DAY | ONCE A WEEK | 192.168.10.2,target-backup.2000.000 | 1 | 2006.04.12.01:10 | 2006.04.12.01:20 |
| G2 | ONCE A DAY | ONCE EVERY TWO WEEKS | 192.168.10.2,target-backup.2000.000 | 2 | 2006.04.12.01:30 | 2006.04.12.01:40 |
| --- | --- | --- | --- | --- | --- | --- |

| TARGET ID 1501 | PRIMARY DEVICE ID 1502 | SECONDARY LU NUMBER 1503 | COPY DESTINATION DEVICE ID 1504 | RAID GROUP 1505 | COPY DESTINATION LU NUMBER 1506 |
|---|---|---|---|---|---|
| #1 | 192.168.10.1,target-backup.1000.000 | 300 | 192.168.10.2,target-backup.2000.000 | 1 | 100 |
| #2 | 192.168.10.1,target-backup.1000.000 | 301 | 192.168.10.2,target-backup.2000.000 | 2 | 200 |
| --- | --- | --- | --- | --- | --- |

1500

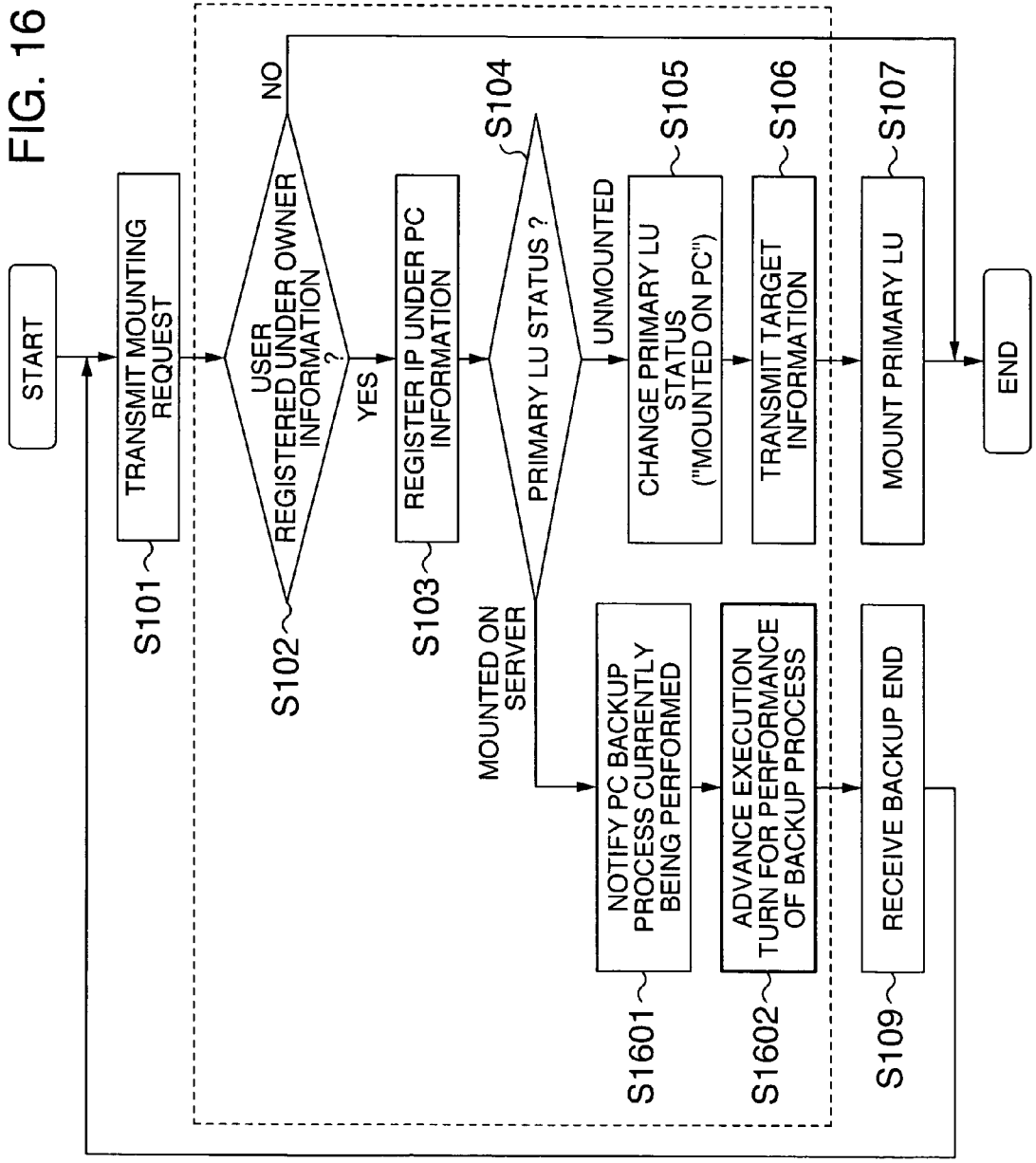

| TARGET ID | EXECUTION ORDER |
|---|---|
| #1 | 3 |
| #2 | 1 |
| ⋮ | ⋮ |

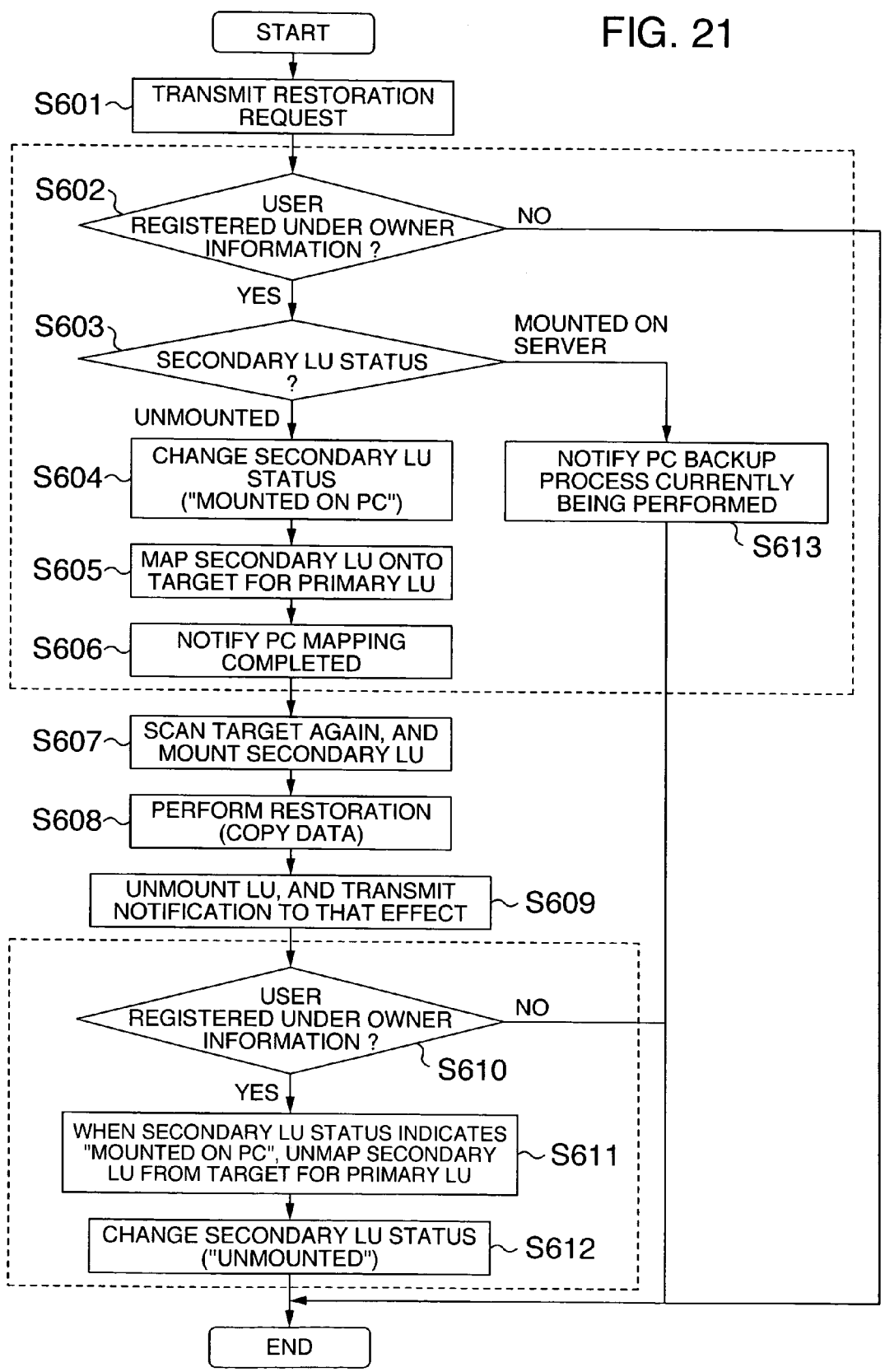

COMPUTER SYSTEM FOR MANAGING BACKUP OF STORAGE APPARATUS AND BACKUP METHOD OF THE COMPUTER SYSTEM

INCORPORATION BY REFERENCE

The present application claims priority from Japanese application JP2006-150868 filed on May 31, 2006, the content of which is hereby incorporated by reference into this application.

BACKGROUND

The present invention relates to a backup system for a personal computer (hereinafter referred to as a "PC"), and more particularly to a backup system for a computer system wherein a plurality of PCs employ storage areas in a storage device via a network.

A magnetic disk storage device (hereinafter referred to as an "HDD") is used to store data obtained by a computer. In order to prepare for a case wherein these data are lost or damaged, the computer makes a copy of data stored on the HDD and transfers the copy to a second HDD. This data protection process is generally called a backup. Normally, when backing up data for a PC, a user manually designates for the backup a source HDD and a destination HDD, and initiates the backup process and copies data at a specific time. As another method, a backup process for data stored on a specific HDD is written as a shell script and periodically performed.

Recently, a network type storage device (hereinafter simply referred to as a storage device) that can be connected to a computer has become available because use is made of a network, such as an iSCSI or a Fibre Channel (FC). In a computer system that uses a storage device, each computer employs storage areas (Logical Units: LUs) obtained by logically dividing the storage device, instead of the HDD of the computer (hereinafter referred to as a "local HDD").

One backup method for the LU of a storage device is proposed, for example, in US2005/0086443A1. According to US2005/0086443A1, the storage device automatically backs up the LU at a date and time as designated by a user. Furthermore, when the computer employed is a server computer, a manager systematically controls the booting/shutdown of the computer and the start/end of an application, thereby enabling the designation of an appropriate backup date and time.

In a computer system wherein a plurality of PCs employ the LUs of a storage device via a network, the booting/shutdown of the PCs and the start/end of an application are performed irregularly, or the LUs are employed by a user for an extended period of time. Therefore, even when a backup execution date and time previously designated by a user are reached, the LUs provided for the storage device may still be used.

According to a conventional method, when an LU is still being employed, no means is available for detecting this, and the storage device starts the backup process when the backup date and time are reached. However, since I/O activity is continued for the LU, the backup process can not be performed.

SUMMARY

An object of the present invention is to provide a system whereby, for a computer, but especially for a personal computer (PC), that employs LUs for a storage device instead of a local HDD, a manager collectively performs backups for the LUs, without any load being imposed on a user.

In a computer system wherein a storage system and a management computer are provided, the storage system includes: a first storage area, for storing data used by a computer that is connected to the storage system; and a second storage area, for storing copies of data stored in the first storage area. The management computer includes first management information, used to manage frequencies for the preparation of copies of data stored in the first storage area. When the management computer receives from another computer a notification indicating that the first storage area has been unmounted, the management computer employs the first management information to determine whether data in the first storage area should be copied. When the data should be copied, the management computer mounts the first storage area and copies the data in the first storage area to a second storage area.

Further, until the copying of data stored in the first storage area to the second storage area has been completed, the management computer inhibits the writing, by another computer, of data in the first storage area.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram showing an example mounted status information management table stored in the storage unit of the backup management server;

FIG. 8 is a diagram showing an example pair management table stored in the storage unit of the backup management server;

FIG. 14 is a diagram showing an example group schedule management table stored in the storage unit of the backup management server according to the second embodiment;

FIG. 15 is a diagram showing an example remote pair stored in the storage unit of the backup management server according to the second embodiment;

FIG. 16 is a flowchart showing the mounting processing performed by a computer, the backup management server and a storage device according to the second embodiment;

FIG. 21 is a flowchart showing the restoration processing performed by the computer, the backup management server and the storage device according to the second embodiment.

DETAILED DESCRIPTION OF THE EMBODIMENTS

Figure 1:
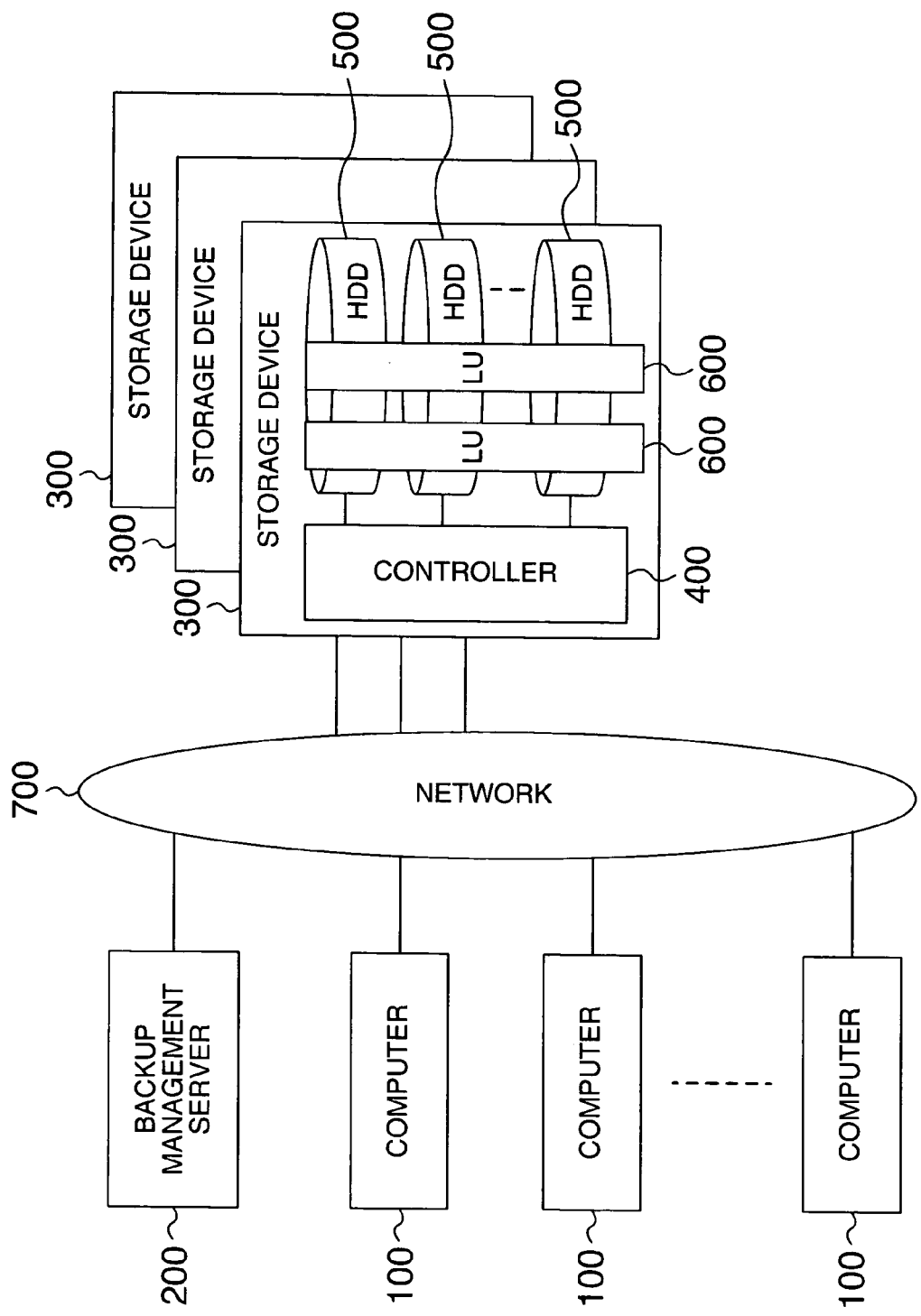
FIG. 1 is a schematic diagram showing the configuration of a computer system according to a first embodiment of the present invention.

The policy for the operation of a backup system of this invention will now be described.

(1) Person Who Performs Backups

A backup management server acts as a user, and collectively performs backups at a frequency designated by a manager.

(2) Times Backups are to be Performed

According to the backup system of the invention, a backup process is performed when one of the following conditions exists.

When a PC unmounts an LU, a backup is performed by the backup management server. When a PC mounts an LU, the backup process is not required.

The backup management server performs a backup process based on a schedule, such as on a date and within a time frame (e.g., 0 to 6 o'clock) designated by a manager. The backup management server acquires a backup for an LU in accordance with the schedule, regardless of whether the pertinent LU is mounted on the PC.

(3) How to Cope with a Case Wherein a User is to Mount an Lu While a Backup Process is being Performed.

According to this backup system, the mounting of an LU on a PC is inhibited during a backup process. When a user instructs the mounting of an LU on a PC, the backup management server notifies the user that a backup process is currently being performed and inhibits the mounting of the LU by the user. When the backup process has ended, the backup management server transmits a notification to that effect to the PC of the user.

(4) Backup Methods

Copying means for a storage device is employed. The storage device includes copying methods, such as volume replication and snapshots, and remote volume replication. The volume replication and snapshots are copy functions performed in a single housing, and the remote volume replication is a copy function performed between housings. According to the backup system of the invention, these functions are employed together to perform the following backup processes.

Backup process for one phase by using only volume replication or a snapshot

Backup process for two phases by using a snapshot and volume replication (or remote volume replication), or volume replication and remote volume replication In the following explanation, a backup for a first phase is called a primary backup process, and a backup for a second phase is called a secondary backup process.

(5) Restoration Means

According to the backup system of the invention, the use of restoration means is enabled by employing one of the following methods.

For each LU, a manager performs restoration.

For each file, a user performs restoration.

The backup system according to the present invention will now be described by referring to two embodiments. According to a first embodiment of the invention, explanation will be given for a system that performs a backup process for the first case in (2), wherein a PC has unmounted an LU. Further, the first case in (4), i.e., a backup for one phase, will be employed as the backup method.

According to a second embodiment of the present invention, explanation will be given for a system that performs the backup process for the second case in (2), steadily, and at a designated date and time. Further, the backup for two phases in (4) will be employed as the backup method. In addition, the restoration method employed for each file will also be explained.

First Embodiment

<System Configuration>

Figure 2:
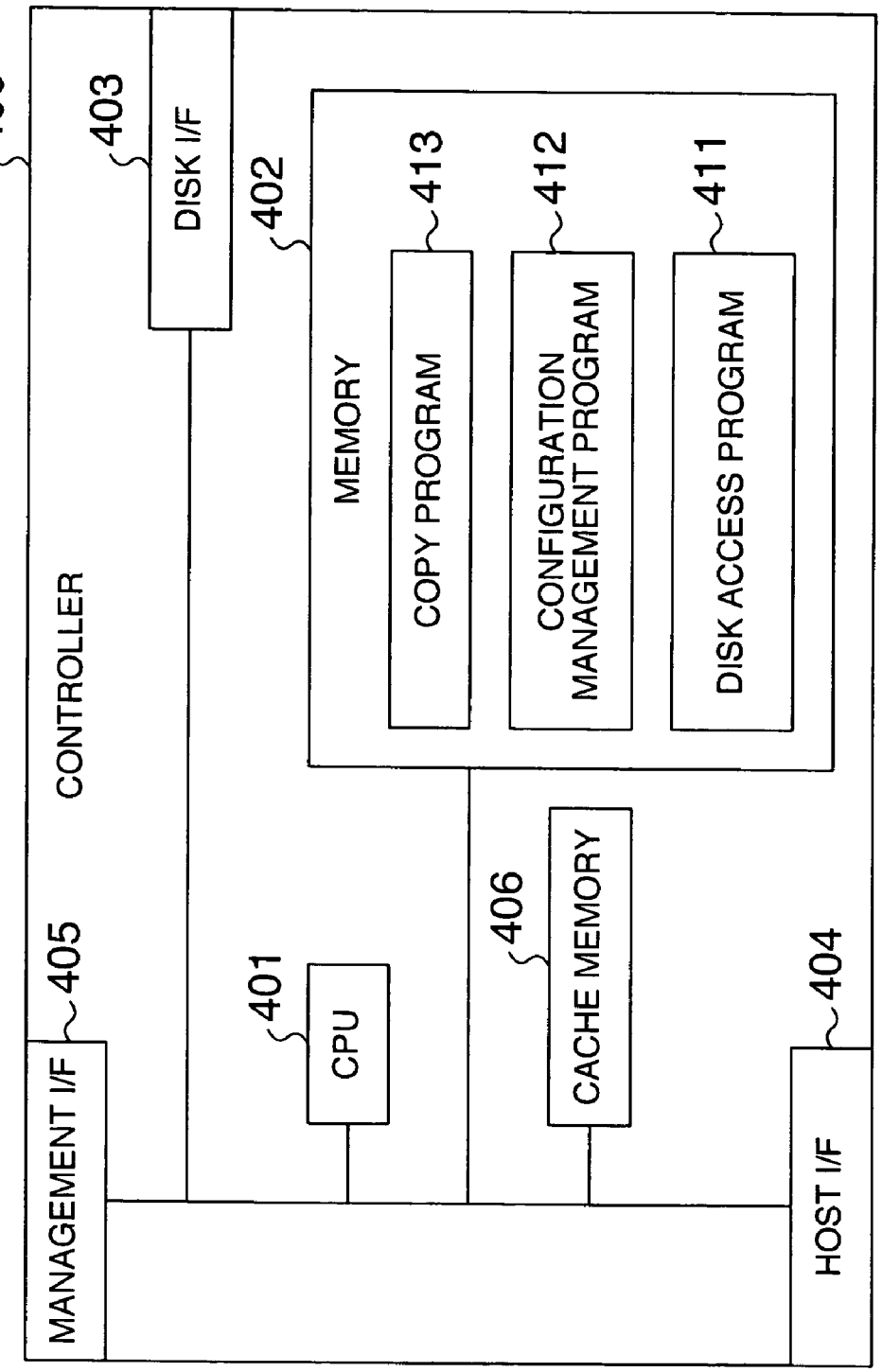
FIG. 2 is a conceptual diagram showing the internal arrangement of a storage control unit according to the first embodiment.
Figure 3:
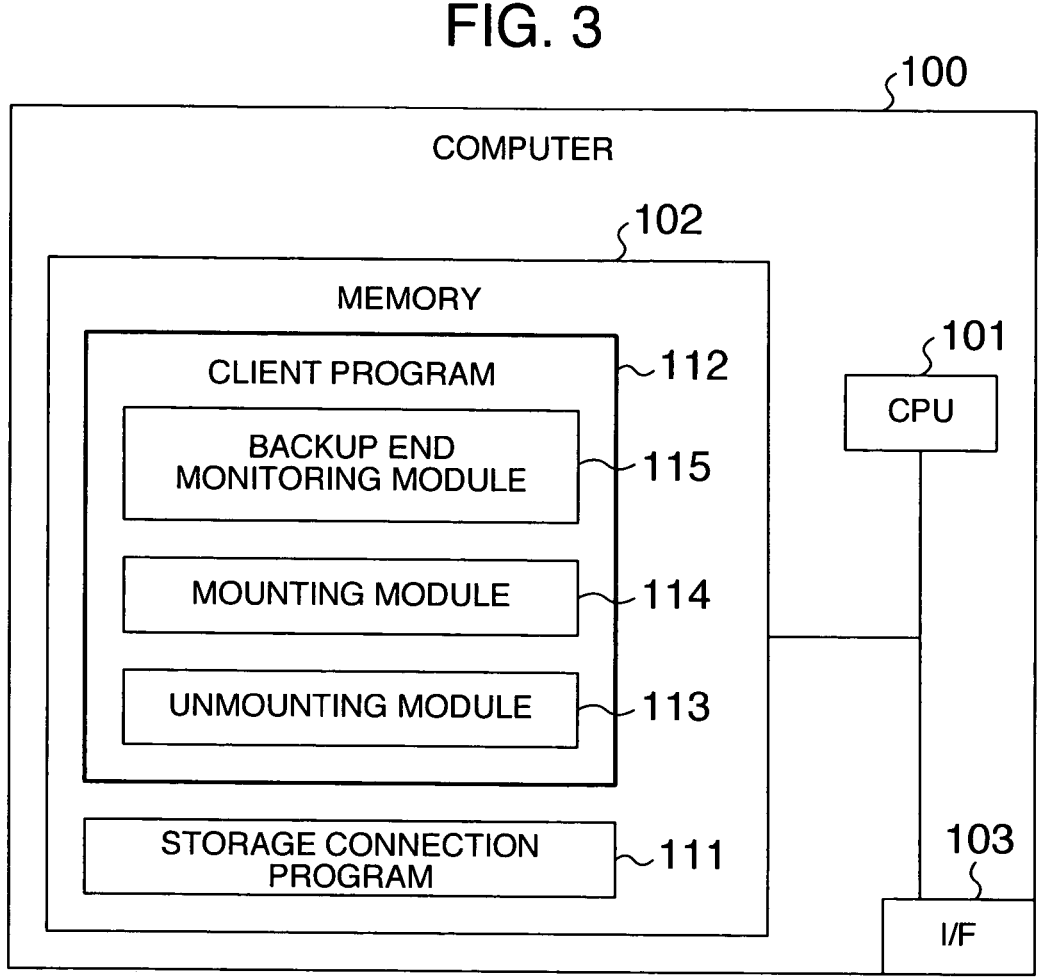
FIG. 3 is a conceptual diagram showing the internal arrangement of a computer according to the first embodiment.
Figure 4:
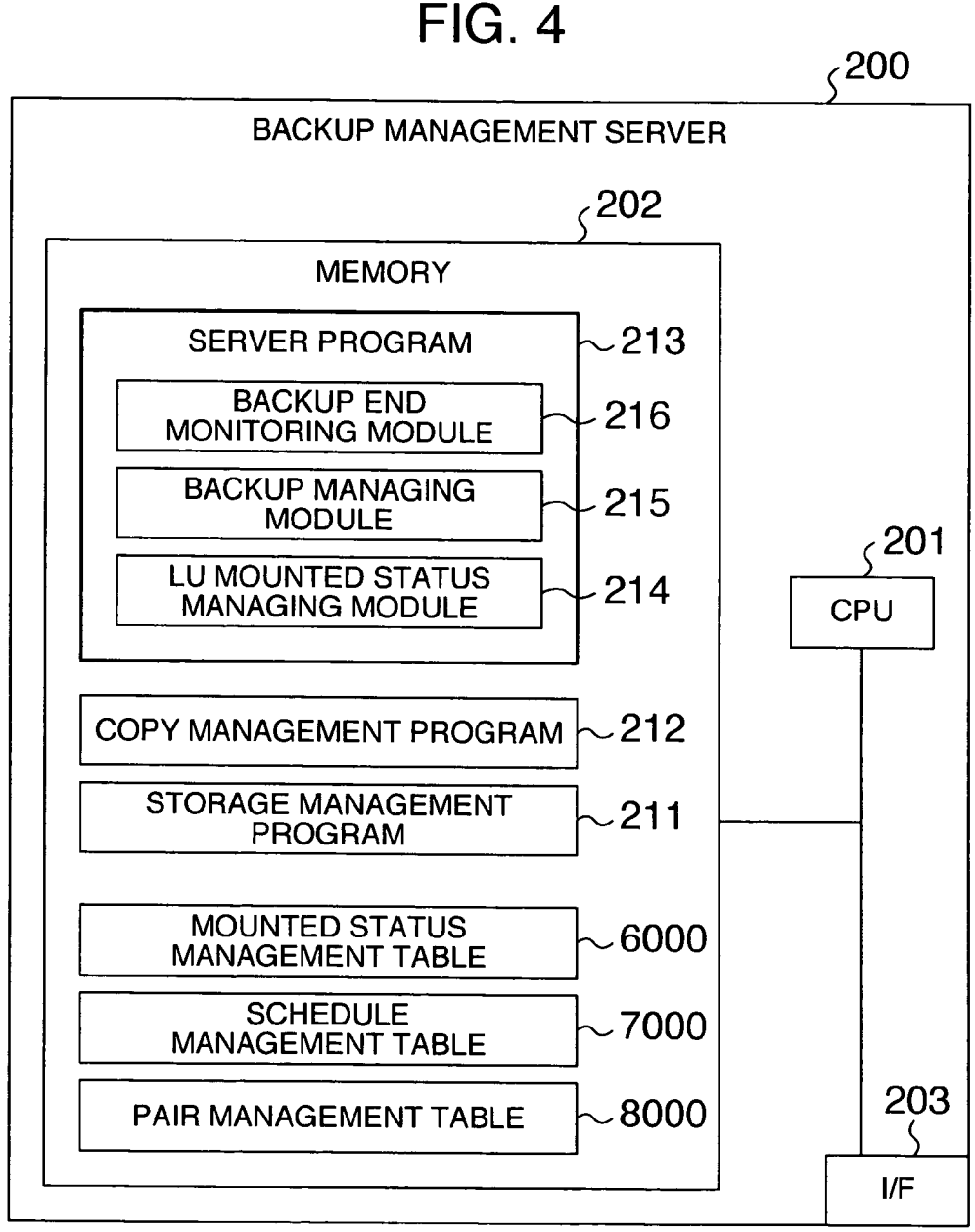
FIG. 4 is a conceptual diagram showing the internal arrangement of a backup management server according to the first embodiment.

The schematic configuration of a computer system according to a first embodiment of the present invention will now be described while referring to FIGS. 1 to 4. FIG. 1 is an explanatory diagram showing the schematic configuration of the computer system of this embodiment. FIG. 2 is a conceptual explanatory diagram showing the internal arrangement of a computer of this embodiment. FIG. 3 is a conceptual explanatory diagram showing the internal arrangement of a backup management server of this embodiment. FIG. 4 is a conceptual explanatory diagram showing the internal arrangement of a storage device for the first embodiment.

As shown in FIG. 1, the computer system according to the first embodiment includes: a plurality of computers 100, which are PCs employed by users; a backup management server 200, which performs a backup process; and a plurality of storage devices 300, which include LUs used by the PCs. The computers 100, the backup management server 200 and the storage devices 300 are interconnected via an IP network 700. The IP network 700 is a local area network (LAN) constructed using ethernet (trademark) and via the IP network 700, data transfer is performed by using the TCP/UDP/IP protocol as a communication protocol. In this embodiment, the iSCSI protocol is employed for communication between the computers 100 and the storage devices 300.

Each of the storage devices 300 includes a controller 400 and a plurality of magnetic hard disk drives (HDDs) 500. Each storage device 300 is a disk array device having a RAID structure composed of the HDDs 500, and provides one or more logical volumes. These logical volumes are also called logical units (hereinafter referred to as "LUs") 600. Instead of an HDD, a non-volatile semiconductor memory, such as a flash memory, may be employed as a storage medium in each storage device 300, or an HDD and a semiconductor memory may be mounted together.

As shown in FIG. 2, the controller 400 of each storage device 300 internally includes a CPU 401, a memory 402, a disk I/O interface (hereinafter referred to as a "disk I/F") 403, a host I/O interface (hereinafter referred to as a "host I/F") 404, a management I/O interface (hereinafter referred to as a "management I/F") 405 and a cache memory 406. The CPU 401, the memory 402, the disk I/F 403, the host I/F 404, the management I/F 405 and the cache memory 406 are interconnected via a bus.

The CPU 401 is an operation processing unit that reads various programs from the memory 402 and executes the programs. The memory 402 is a so-called internal semiconductor storage unit for storing various programs, for example, and is generally constituted by a non-volatile memory. The disk I/F 403 is connected to the HDDs 500. The host I/F 404 is connected to the computers 100 and the backup management server 200 via the IP network 700. And the management I/F is connected to the backup management server 200 via the IP network 700.

A disk access program 411, a configuration management program 412 and a copy program 413 are stored in the memory 402.

The disk access program 413 receives, from the computers 100 via the host I/F 404, read/write requests relative to the LUs 600, and executes these instructions for the HDDs 500 via the disk I/F 403. The configuration management program 412 receives, from the backup management server 200, via the management I/F 405, instructions for the preparation of the LUs 600 for the HDDs 500, for the creation of targets that are information used by the computers 100 to identify the individual LUs 600, and for the mapping of the LUs 600 in the targets, and then executes these instructions. The copy program 413 receives, via the host I/F 404, a copying instruction for the LUs 600, and transfers this instruction to the disk access program 411 to perform a copying process.

The cache memory 406 is a semiconductor storage unit for temporarily storing the operation process results used by the CPU 401, and is generally formed as a volatile memory. In order to avoid data loss due to the occurrence of a fault, the cache memory 406 may be doubled.

As shown in FIG. 3, each of the computers 100 internally includes a CPU 101, a memory 102 and an I/O interface (hereinafter referred to as an "I/F") 103. The CPU 101, the memory 102 and the I/F 103 are interconnected via a bus. The CPU 101 is an operation processing unit that reads various programs from the memory 102, and executes the programs. The memory 102 is a so-called internal storage unit, and includes both a non-volatile memory for the storage, for example, of various programs, and a volatile memory for the temporary storage of operation processing results. And the I/F 103 is connected to the storage devices 300 and the backup management server 200 via the IP network 700.

A storage connection program 111 and a client program 112 are connected to the memory 103. The client program 112, a program related to the backup system of this invention, controls the mounting/unmounting of the LUs 600. The storage connection program 111, which is a program that executes the iSCSI protocol, accesses the target of the storage device 100, which will be described later, and reads/writes the data block in the LU 600.

As shown in FIG. 4, the backup management server 200 internally includes a CPU 201, a memory 202 and an I/O interface (hereinafter referred to as an "I/F") 203. The CPU 201, the memory 202 and the I/F 203 are interconnected by a bus. The CPU 201 is an operation processing unit that reads various programs from the memory 202, and executes the programs. The memory 202 is a so-called internal storage unit, and includes a non-volatile memory for the storage, for example, of various programs, and a volatile memory for the temporary storage of operation processing results. The I/F 203 is connected to the computers 100 and the storage devices 300 via the IP network 700.

A storage management program 211, a copy management program 212, a server program 213, a mounted stage management table 6000, a schedule management table 7000 and a pair management table 8000 are stored in the memory 202. The server program 213 is a program for executing the backup process related to the backup system of this invention. The copy management program 212 transmits an instruction to the copy program 413 of each storage device 300 to perform copying. The storage management program 213 is a program that transmits an instruction to the configuration management program 412 of each storage device 300 to prepare an LU 600, or a target, and is employed to perform a restoration process that will be explained for a second embodiment.

The mounted status management table 6000 is a table for the management of the mounted statuses of the LUs 600, which will be described later while referring to FIG. 6. The schedule management table 7000 is a table for the management of the frequencies for the acquisition of a backup for each LU 600, and will be described later while referring to FIG. 7. The pair management table 8000 is a table for the management of correlations between LUs 600 (hereinafter referred to as "primary LUs 600"), in which the data used by the computers 100 are stored, and backup destination LUs 600 (hereinafter referred to as "secondary LUs 600") for the data stored in the primary LUs 600.

<LU Arrangement of Storage Devices>

The LU arrangement of the storage devices 300 according to this embodiment will now be explained while referring to FIG. 5.

Figure 5:
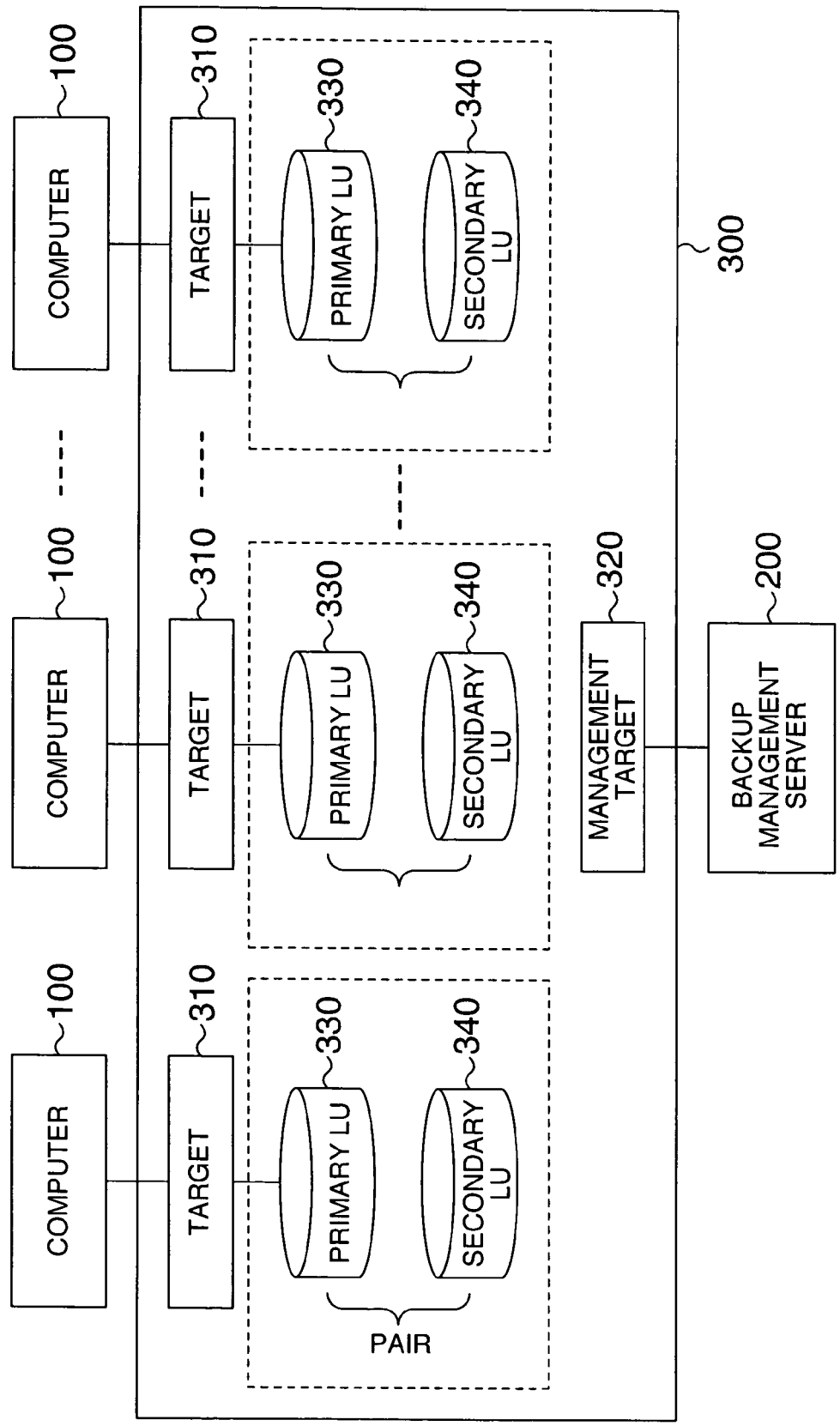
FIG. 5 is a conceptual diagram showing the LU structure of a storage device according to the first embodiment.

The storage connection programs 111 of the computers 100 access the storage devices 300 via the host I/Fs 404 by using identification information called targets 310, shown in FIG. 5. When the iSCSI protocol is employed, an IP address for identifying the port of the host I/F 404 and target information for identifying an LU are provided as identification information for the targets 310. Further, some apparatuses employ an initiator name as target information. The controller 400 of each storage device 300 performs the mapping of one or more LUs 600 for a specific target 310. And when a computer 100 accesses the target 310 of the storage device 300, the LUs 600 mapped for the target 310 are mounted on the computer 100.

For a system that employs the copying function of the storage device 300 to perform the backup process, as shown in FIG. 5, the individual storage devices 300 include a volume pair consisting of a primary LU 330 and a secondary LU 340. The controllers 400 map the primary LUs 330 to the targets 310 of the individual computers 100. The copy management program 212 of the backup management server 200 accesses a management target 320, used for data management, and transmits a copying instruction to the copy programs 413 of the storage devices 300.

<Structure of a Backup Client Program>

The client program 112 includes a mounting module 114, an unmounting module 113 and a backup end monitoring module 115.

The mounting module 114 is a program that mounts the LUs 600 on the computers 100, and is executed, for example, when the computer 100 is activated, or when the CPU 101 of the computer 100 boots the OS in response to user manipulation. The unmounting module 113 is a program that unmounts the LUs 600 from the computers 100, and is executed, for example, when the computer 100 is halted, or when the CPU 101 of the computer 100 shuts down the OS in response to user manipulation. The backup end monitoring module 115 is a program that monitors the end of a backup process performed by the server program 213, and is always performed while the CPU 101 is executing the OS.

<Arrangement of a Backup Server Program>

The server program 213 includes an LU mounted status managing module 214, a backup managing module 215 and a backup end monitoring module 216. The three programs are always executed by the CPU 201. The LU mounted status managing module 214 manages the statuses of the LUs by using the mounted status management table 6000 shown in FIG. 6, and transmits LU status notifications to the client program 112.

As shown in FIG. 6, the mounted status management table 6000 is used to manage a target ID 6001, owner information 6002, target information 6003, a primary LU status 6004, a secondary LU status 6005 and PC information 6006. Information for uniquely identifying the targets 310 is entered under the target ID 6001. Information for identifying a computer 100 to which the target 310 is allocated, or a user, is entered under the owner information 6002. An MAC address can be employed as information for identifying the computer 100 to which the target 310 is allocated; however, for the backup system of this embodiment, a CHAP-ID, which is target authentication information, is employed as the owner information 6002. Further, information such as an IP address, a target name or an initiator name that is used to identify the target 310, inside the server program 213, is entered under the target information 6003. Information for the management of the individual LUs 600 mapped to the targets 310, and status information indicating whether the paired primary LU 330 and secondary LU 340 are mounted on a specific apparatus are entered under the primary LU status 6004 and the secondary LU status 6005. Specifically, information for four statuses is stored: "unmounted (the status wherein no computers use either of the LUs)", "mounted on a PC (the status wherein the computer 100 is currently using the pertinent LU)", "mounted on a server (the status wherein the backup management server 200 is performing the backup process for the pertinent LU)" and "inhibit mounting (the status wherein both the mounting of the pertinent LU by the computers 100 and the mounting of the pertinent LU and the performance of a backup process by the backup management server 200 are disabled)". The IP address of the computer 100 at which the LU 600 mapped to the target 310 is currently mounted is entered under the PC information 6006. The PC information 6006 is used to transmit the backup execution results.

Figures 7, 11:
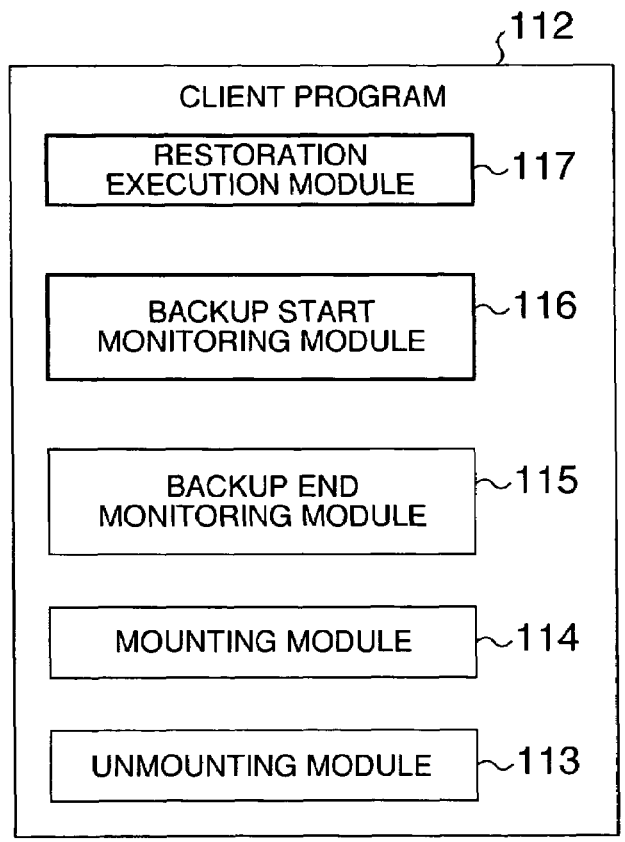
FIG. 7 is a diagram showing an example schedule management table stored in the storage unit of the backup apparatus.
FIG. 11 is a conceptual explanatory diagram showing the internal structure of a client program according to a second embodiment of the present invention.

The backup managing module 215 designates a schedule for performing backups for the LUs 600 by referring to the schedule management table 7000 in FIG. 7 and the pair management table 8000 in FIG. 8.

As shown in FIG. 7, the schedule management table 7000 is a table for managing target IDs 7001, backup methods 7002 and backup frequencies 7003. Information for uniquely identifying the targets 310 is entered under the target ID 7001, as well as under the target ID 6001. Under the backup method 7002, information indicating the backup method is either volume replication or a snapshot is entered for each target 310. Under the backup frequency 7003, information indicating a backup execution frequency (e.g., once each week) is entered for each target.

As shown in FIG. 8, the pair management table 8000 is a table for managing target IDs 8001, device IDs 8002, primary LU numbers 8003 and secondary LU numbers 8004, and execution dates and times 8005. Information for uniquely identifying the targets 310 is entered under the target IDs 8001, as well as under the target ID 6001. Information for identifying the device address of the storage device 300 that issues a copying instruction is entered under the device ID 8002. Specifically, the address of the management I/F 405 and management target information are employed as the device ID 8002. As well as the target information, information (an IP address and a management target name) for identifying the management target 320 inside the server program 213 is entered as management target information. Identification information for the primary LU 330, which corresponds to the target 310 entered for each target ID 8001, and identification information for the secondary LU 340, which is the copying destination for data stored in the primary LU 330, are entered under the primary LU number 8003 and the secondary LU number 8004. Information indicating a date and time at which copying was executed is entered under the execution date and time 8005. The backup end monitoring module 216 monitors the end of the copy management program 212, and when the execution has been completed, transmits a backup end notification to the computer 100.

<Preparation for Backup Service Start>

A manager prepares for the start of a backup service by employing the following procedures.

First, the CPU 201 of the backup management server 200 boots the storage management program 211, and employs the configuration management program 412 to create the primary LU 330, the secondary LU 340 and the target 310 in a storage device 300. Further, a CHAP-ID and other secret information are set for the target 310. In this case, the CHAP-ID and the secret information are information employed for CHAP authentication, and correspond to a user ID and a password that a user employs for log-in authentication when operating the OS of the computer 100. Following this, the CPU 201 maps the primary LU 330 to the target 310 as a data storage destination to be employed by the computer 100, and in addition, creates a management target 320.

Then, the CPU 201 registers, in the mounted status management table 6000, a correlation between the CHAP-ID, which is employed and is to be stored as the owner information 6002, and the target 310. When the CPU 201 has registered the CHAP-ID corresponding to the target 310, the target 310 is allocated to the user of the PC, and the designated CHAP-ID and the secret information are transmitted to the user.

The CPU 201 designates, for each user, the backup method and the backup frequency, and registers them in the schedule management table 7000.

Furthermore, the CPU 201 determines a secondary LU 340 consonant with the primary LU 330, and registers, in the pair management table 8000, the device ID of the storage device 300, whereat the pair of primary and secondary LUs are present, and the LU numbers of the primary LU and secondary LU.

The CPU 201 sequentially boots the server program 213 and starts the backup service.

<Overview of the Backup Process>

Explanation will now be given for an overview of the backup process that uses volume replication or a snapshot, and the processing for the employment of a copying instruction.

First, the CPU 201 of the backup management server 200 boots the copy management program 212, which then issues a copy creation instruction to the copy program 413 and registers a paired primary LU 330 and secondary LU 340. Then, the CPU 201 issues a write block cache instruction to separate the primary LU 330 and the secondary LU 340. While the primary LU 330 and the secondary LU 340 are separated, the computer 100 mounts the primary LU 330. And while the primary and secondary LUs 330 and 340 are separated, the data block written by the computer 100 is not copied to the secondary LU 340, instead, it is stored in the cache memory 406 of the storage device 300.

When the computer 100 unmounts the primary LU 330, the write process for the primary LU 330 is ended. At this time, the backup management server 200 inhibits the remounting of the primary LU 330 by the computer 100, and issues a synchronization instruction to the copy program 413 via the copy management program 212. The copy program 413 copies to the secondary LU 340 data stored in the cache memory 406, and through this process, the backup of data from the primary LU 330 to the secondary LU 340 is completed. When the synchronization instruction is ended, the write block cache instruction is again issued, and the primary LU 330 and the secondary LU 340 are separated. Thus, the computer 100 can again mount the primary LU 330.

<Processing for a Backup Service>

The backup processing will now be described while referring to FIGS. 9 and 10.

Figure 9:
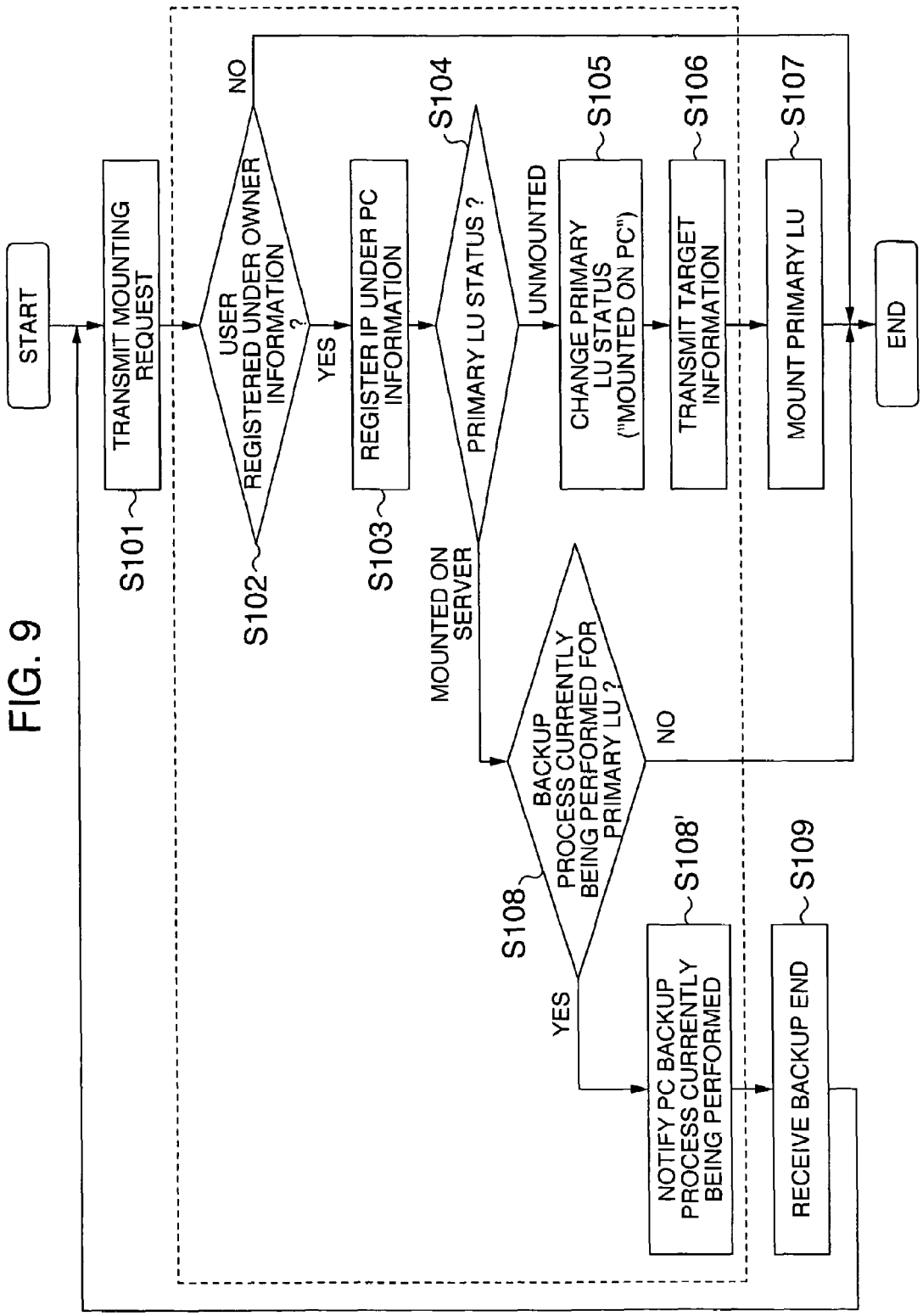
FIG. 9 is a flowchart showing the LU mounting processing performed by the computer, the backup apparatus and the storage device according to the first embodiment.

FIG. 9 is a flowchart showing the processing routine performed when a user has entered an LU mounting instruction.

The user employs a CHAP-ID as an input argument to boot the mounting module 114 of the computer 100. The mounting module 114 transmits the CHAP-ID and a mounting request instruction to the LU mounted status managing module 214 of the backup management server 200 (S101).

The LU mounted status managing module 214 examines the owner information 6002 in the mounted status management table 6000, and determines whether user identification information (for this embodiment, CHAP-ID) included in the mounting request has been registered as owner information 6002 in the mounted status management table 6000. When the identification information has not been registered, the processing is terminated. When the identification information has been registered, a target 310 consonant with the user is designated (S102).

Sequentially, in the mounted status management table 6000, the LU mounted status managing module 214 enters, as PC information 6006 correlated with the target 310 designated at Step S102, the IP address of the computer 100 that transmitted the mounting request (S103).

Following this, the primary LU status 6004 of the target 310 is confirmed. When the primary LU status 6004 is "mounted on a server", program control is shifted to S108, and when the primary LU status 6004 is "unmounted", program control advances to Step S105. Immediately after the backup service is started, the status of the primary LU 330 employed by the computer 100 is "unmounted", and program control advances to Step S105 (S104).

At Step S105, the LU mounted status managing module 214 changes the primary LU status to "mounted on a PC", and registers this status in the mounted status management table 6000.

The LU mounted status managing module 214 transmits target information to the mounting module 114 of the computer 100 (S106).

The mounting module 114 boots the storage connection program 111, and mounts the LU (S107).

Through the above described processing, the computer 100 can perform a read/write operation for the primary LU 330.

When the user enters an LU mounting instruction while the backup management server 200 is performing the backup process, program control advances to S108 because at Step S104 the primary LU status 6004 indicates "mounted on a server". When the backup process is currently being performed for the primary LU 330 at Step S108, the LU mounted status managing module 214 transmits a notification, indicating the backup process is currently being performed, to the mounting module 114 of the computer 100 that transmitted the mounting request (S108').

Upon receiving this notification, the mounting module 114 of the computer 100 ends the processing.

When the server program 213 ends the backup process at Step S104, a backup end notification is transmitted to the computer 100. The backup end monitoring module 115 of the computer 100 receives this notification, and to notify the user, outputs to the CRT of the computer 100 a message indicating that the backup process has been ended (S109).

Upon receiving this notification, the user again boots the mounting module 114, at S101, to mount the LU.

Figure 10:
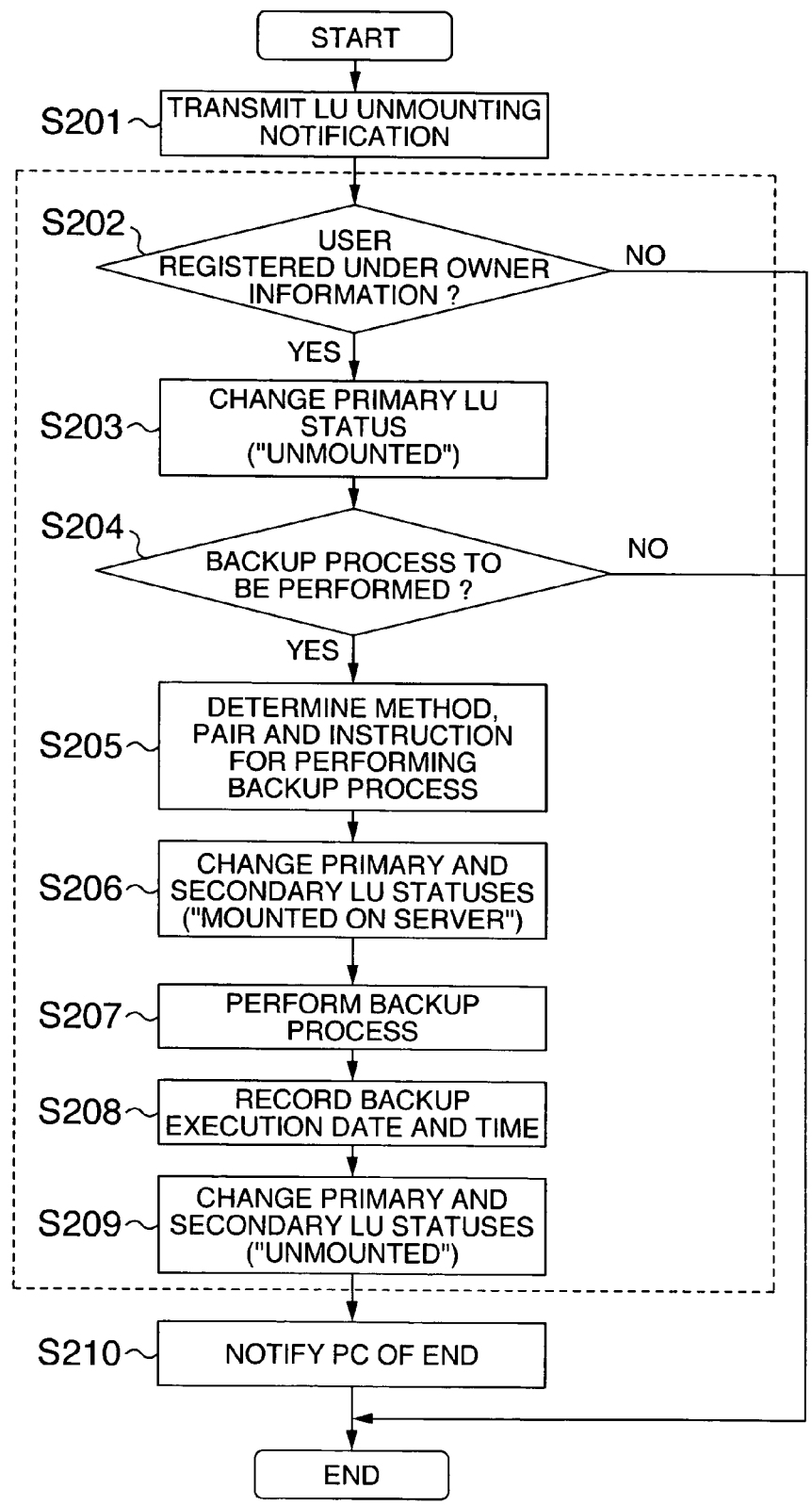
FIG. 10 is a flowchart showing the backup mounting processing performed by the computer, the backup apparatus and the storage device according to the first embodiment when LUs are mounted.

FIG. 10 is a flowchart showing the processing routine performed when the backup process is to be started by the entry of a user LU unmounting instruction.

A user employs a CHAP-ID as an input argument to boot the unmounting module 113, and the unmounting module 113 transmits the CHAP-ID and an unmounting instruction to the LU mounted status managing module 214 of the backup management server 200 (S201).

The LU mounted status managing module 214 examines the owner information 6002 in the mounted status management table 6000, and determines whether user identification information (for this embodiment, a CHAP-ID) included in the unmounting instruction has been registered as the owner information 6002 in the mounted status management table 6000. When the identification information has not been registered, the processing is terminated. But when the identification information has been registered, a target 310 consonant with the user is designated (S202). Sequentially, the LU mounted status managing module 214 changes the primary LU status 6004 of the target 310 to "unmounted", and issues a request to the backup managing module 215 for a backup process (S203). The backup managing module 215 then refers to the backup frequency 7003 in the schedule management table 7000 and the execution date and time 8005 in the pair management table 8000 to determine whether a backup process should be performed. For example, when the backup frequency 7003 in the schedule management table 7000 for the target 310 is once a week and the execution date and time 8005 in the pair management table 8000 indicates a time that is only three days before, no backup process is performed for this target 310. Or, when the backup frequency 7003 in the schedule management table 7000 for the target 310 is once a week, and the execution date and time 8005 indicates a time that is seven days before, the backup process for this target 310 is performed. Since the execution date and time 8005 are not immediately recorded following the start of the backup service, it is determined that the backup process should be performed, and program control advances to step S205. When the backup process is not performed, the processing is terminated (S204).

When the backup process is to be performed, the backup managing module 215 refers to the schedule management table 7000 and the pair management table 8000, and determines the backup method, the primary and secondary LU numbers, a copy instruction type and a destination storage device 300 to be used for a copy instruction. Immediately following the start of the backup service, a pair creation instruction is employed as a copy instruction, and thereafter, a write block synchronization instruction is employed (S205).

The backup managing module 215 then changes the status for both the primary and the secondary LU to "mounted on a server" (S206).

Thereafter, the backup managing module 215 executes the copy management program 212 by employing, as input arguments, the device ID, the backup method, the copy instruction, the primary LU number and the secondary LU number, and performs the backup process. At Step S207, the copy management program 212 accesses the management target designated by the device ID, and transmits the backup method, the copy instruction, the primary LU number and the secondary LU number to the copy program 413 of the storage device 300, and the copy program 413 performs a copying process (S207).

The backup end monitoring module 216 monitors the end of execution of the copy instruction. When a notification indicating the end of the copy process is received from the copy program 413, the copy management program 212 transmits a write block cache instruction to the copy program 413, and ends the backup process. When the notification of the end of the backup process is received, the backup end monitoring module 216 records the backup execution date and time in the pair management table 8000 (S208), and returns to "unmounted" the status for both the primary LU and the secondary LU in the mounted status management table 6000. Furthermore, in a case wherein the IP address has been designated as the PC information 6006 in the mounted status management table 6000, the backup end monitoring module 216 transmits a backup end notification to the computer 100 for which the IP address is provided (S209).

The backup end monitoring module 115 of the computer 100 receives the backup end notification from the backup end monitoring module 216 of the backup management server 200 (S210). At this time, as previously described at Step S109 in FIG. 9, upon receiving the backup end notification, the computer 100, to notify the user, outputs to the CRT a message indicating that he backup process has ended. Therefore, the user can again boot the mounting module 114 to mount the LU.

As described above, according to the first embodiment, in a case wherein a plurality of users non-periodically mount, on the computers 100, the LUs 600 for the storage devices 300, and employ the LUs 600, the backup process can be performed at the point whereat the LU is unmounted from the computer 100.

Second Embodiment

According to a second embodiment of the present invention, a system that performs a backup process accurately on a date and at a time, as designated, will now be described while referring to FIGS. 11 to 21. Further, a backup method for two phases that employ both snapshot and volume replication (or remote volume replication) will be explained.

<Backup Scheduling Method>

A method for simply forming groups each day and scheduling a target for which a backup is to be acquired is also available. However, for this embodiment, explanation will be given for a system wherein a backup target is to be scheduled for a group for which volume replication (or remote volume replication) is to be performed.

According to this system, targets whose copy destination LUs 600 belong to the same RAID group are defined as a single group.

<Structure of a Backup Client Program>

FIG. 11 is a diagram showing the structure of a client program 112 according to the second embodiment.

The client program 112 includes the components of the first embodiment, a backup start monitoring module 116 and a restoration execution module 117.

The backup start monitoring module 116 is a program that, when a server program 213 has started the backup process, inhibits the writing of data to an LU 600, and unmounts the LU 600 from a computer 100. The backup start monitoring module 116 is always operated by the OS and a CPU 101 of the computer 100. The restoration execution module 117 is a program that mounts a secondary LU 340 on the computer 100, and is operated by the OS and the CPU 101 of the computer 100 in accordance with a user instruction.

<Structure of a Backup Server Program>

Figure 12:
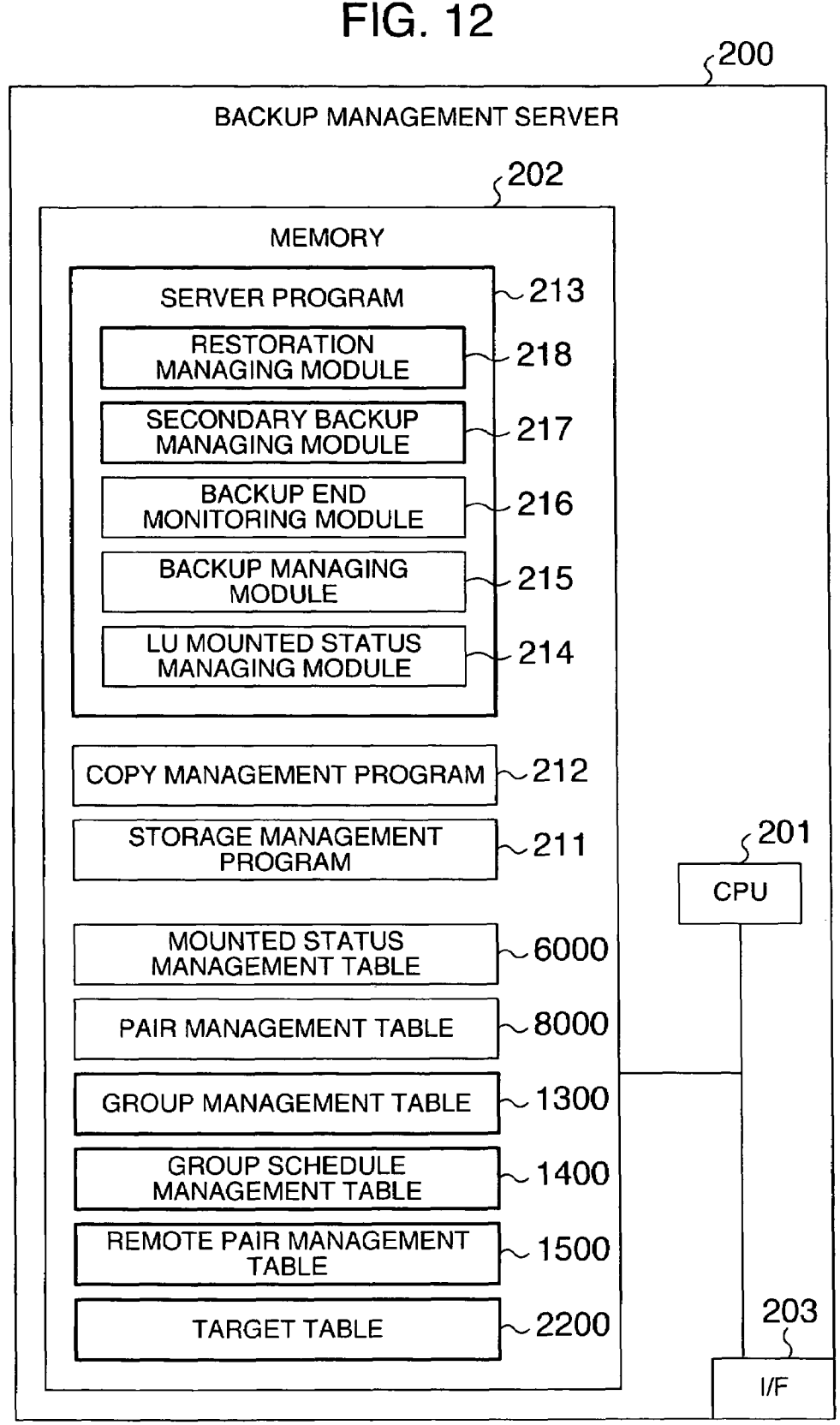
FIG. 12 is a conceptual explanatory diagram showing the internal structure of a server program according to the second embodiment.

FIG. 12 is a diagram showing the structure of the server program 213 according to the second embodiment.

The server program 213 includes the components of the first embodiment, a secondary backup managing module 217 and a restoration managing module 218. These programs are always executed by the CPU 101.

An LU mounted status managing module 214 manages the statuses of individual LUs by using the mounted status management table 6000 shown in FIG. 6.

Figures 13, 17:
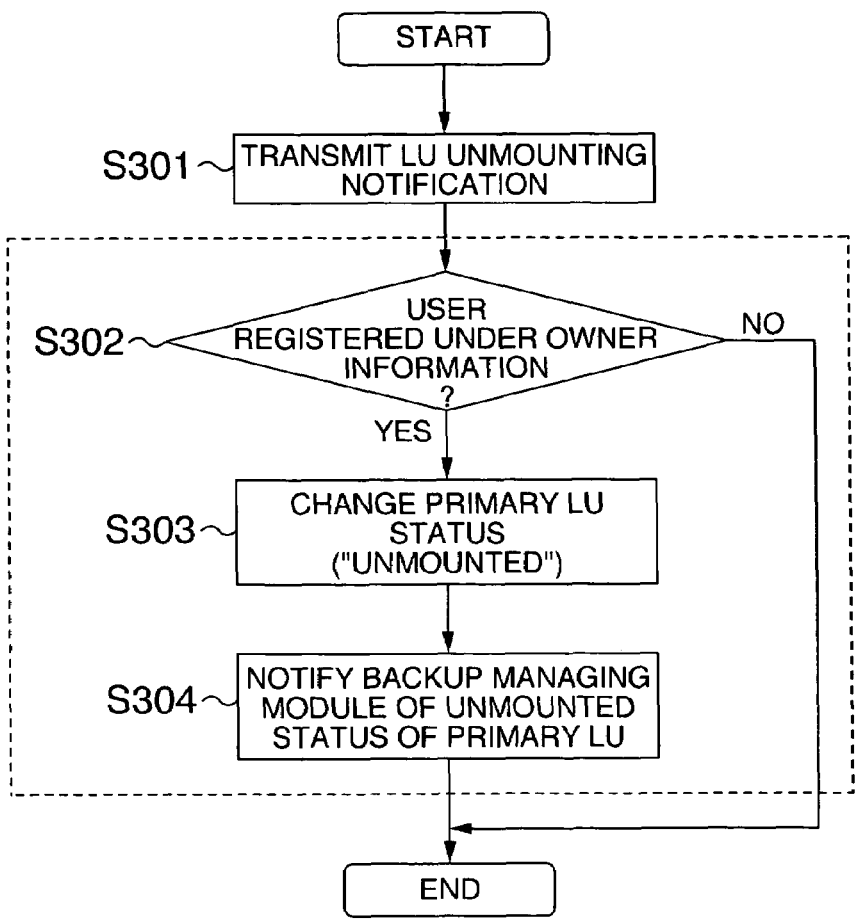
FIG. 13 is a diagram showing an example group management table stored in the storage unit of a backup management server according to the second embodiment.
FIG. 17 is a flowchart showing the unmounting processing performed by the computer, the backup management server and the storage device according to the second embodiment.

A backup managing module 215 does not use the schedule management table 7000 in FIG. 7, but employs a group management table 1300 in FIG. 13 and a group schedule management table 1400 in FIG. 14 to determine a backup target group, and performs the primary backup process by using the pair management table 8000 shown in FIG. 8.

As shown in FIG. 13, the group management table 1300 is a table for managing a target ID 1301, a secondary copy method 1302 and a group identifier 1303. Information for uniquely identifying a target 310 is entered under the target ID 1301. A secondary backup method, such as "volume replication" or "remote volume replication", is entered as the secondary copy method 1302. Information representing a group that constitutes a backup target is entered under the group identifier 1303.

As shown in FIG. 14, the group schedule management table 1400 is a table for managing a group identifier 1401, a primary process 1402, a secondary process 1403, a copy destination device ID 1404, a RAID group 1405, a primary processing date and time 1406 and a secondary processing date and time 1407. Identification information for a group that constitutes a backup target is entered under the group identifier 1401. Information indicating a frequency (e.g., every day) for executing the primary backup process (a snapshot) is entered under the primary process 1402. Information indicating a frequency (e.g., once a week) for executing the secondary backup process is entered under the secondary process 1403. The identifier of a storage device 300 constituting the secondary backup destination is entered under the copy destination device ID 1404. Information representing a RAID group number is entered under the RAID group 1405. And information representing dates and times the backup process has been performed is entered under the primary processing date and time 1406 and the secondary processing date and time 1407.

The secondary backup managing module 217 performs the secondary backup process by using a remote pair management table 1500 in FIG. 15.

As shown in FIG. 15, the remote pair management table 1500 is a table for managing a target ID 1501, a primary device ID 1502, a secondary LU number 1503, a copy destination device Id 1504, a RAID group 1505 and a copy destination LU number 1506. Information for uniquely identifying the target 310 is entered under the target ID 1501. Identification information for a storage device 300 that includes a primary LU 330 is entered under the primary device ID 1502. Identification information for a secondary LU 340 is entered under the secondary LU number 1503, while under the copy destination device ID 1504, identification information for the storage device 300 that issues a remote volume replication instruction is entered for each target. Information representing a RAID group number is entered under the RAID group 1505 as well as under the RAID group 1405. Identification information for the LU 600 for which remote volume replication is to be performed is entered under the copy destination LU number 1506. And the address of a management I/F 405 is employed as a device ID, such as the primary device ID 1502 and the copy destination device ID 1504.

<Processing for Starting a Backup Service>

A manager starts a backup service by employing the following procedures.

First, a CPU 201 for a backup management server 200 boots a storage management program 211, and employs a configuration management program 412 to create a primary LU 330, a secondary LU 340 and a target 310 in a storage device 300. Further, a CHAP-ID and other secret information are designated for a target 310. Then, the CPU 201 maps the primary LU 330 to the target 310 as a storage destination for data employed by the computer 100. And further, the CPU 201 creates a management target 320.

Following this, the CPU 201 employs the configuration management program 412 to create a copy destination LU 600 and the management target 320 in the storage device 300.

Next, the CPU 201 registers, in the mounted state management table 6000, a correlation between the CHAP-ID, which constitutes information to be stored and used as the owner information 6002, and the target 310. When the CPU 201 has registered the CHAP-ID correlated with the target 310, the target 310 is allocated for the user of the PC, and the CHAP-ID and the other secret information are transmitted to the user.

Further, the CPU 201 determines the secondary LU 340 corresponding to the primary LU 330, and registers, in the pair management table 8000, the device ID of the storage device 300 whereat these LUs are present and the LU numbers of the primary LU and the secondary LU.

The frequencies for performing the primary backup process and the secondary backup process are determined for each RAID group of the storage device 300 at the remote volume replication destination, and are registered in the group schedule management table 1400.

A RAID group that is a remote copy destination and a backup method are determined for each target, and are registered in the group management table 1300.

The server program 213 is booted, and the backup service is started. The backup managing module 215 designates a time frame (e.g., from 0 o'clock to 6 o'clock) during which the backup process is to be performed.

<Backup Service Processing>

An overview of the backup process for the second embodiment will now be described while referring to FIGS. 16 to 19.

FIG. 16 is a flowchart showing the processing routine performed when a user has entered an instruction to mount the LU 600. The processing (S101 to S107) performed when the computer 100 mounts the LU 600 is the same as in the first embodiment.

The processes at S1601 and S1602 are performed when a user has entered an instruction to mount the LU 600 during the primary backup process, which will be described later while referring to FIG. 18. When, during the primary backup process, the computer 100 transmits a mounting request to a specific target 310, at the primary LU status confirmation Step (S104) it is confirmed that the status of the primary LU is "mounted on a server". In this case, the LU mounted status managing module 214 transmits, to the mounting module 114 of the computer 100, a notification indicating that the backup process is currently being performed (S1601).

Then, the LU mounted status managing module 214 transmits to the backup managing module 215 a notification indicating that, during the backup process, a mounting request was received from the computer 100. For the target 310 for which the mounting request was received, the backup managing module 215 advances the execution turn in a target table 2200 (which will be described later while referring to FIG. 18) (S1602).

Through this processing, according to the second embodiment, when during the backup process the computer 100 has issued a mounting request for the LU 330 correlated with a specific target 310, the backup process is preferentially performed for the computer 100. Thus, the waiting time for the end of the backup can be reduced.

FIG. 17 is a flowchart showing the process routine performed when a user has entered an LU unmounting instruction. The user boots the unmounting module 113 by using a CHAP-ID as an input argument. Then, the unmounting module 113 transmits the CHAP-ID and an unmounting notification to the LU mounted status managing module 214 (S301).

Upon receiving the LU unmounting notification, the LU mounted status managing module 214 examines the owner information 6002 in the mounted status management table 6000, and determines whether identification information (CHAP-ID in this embodiment) for a user indicated in the unmounting notification is registered under the owner information 6002 in the mounted status management table 6000. When the identification information has not been registered, the processing is terminated. When the identification information has been registered, a target 310 correlated with the user is identified (S302). The LU mounted status managing module 214 changes the primary LU status 6004 to "unmounted" for a target 310 indicated in the LU unmounting notification (S303). The LU mounted status managing module 214 notifies the backup managing module 215 that the primary LU 330 of the target 310 is unmounted (S304), and the processing is terminated.

Figure 18:
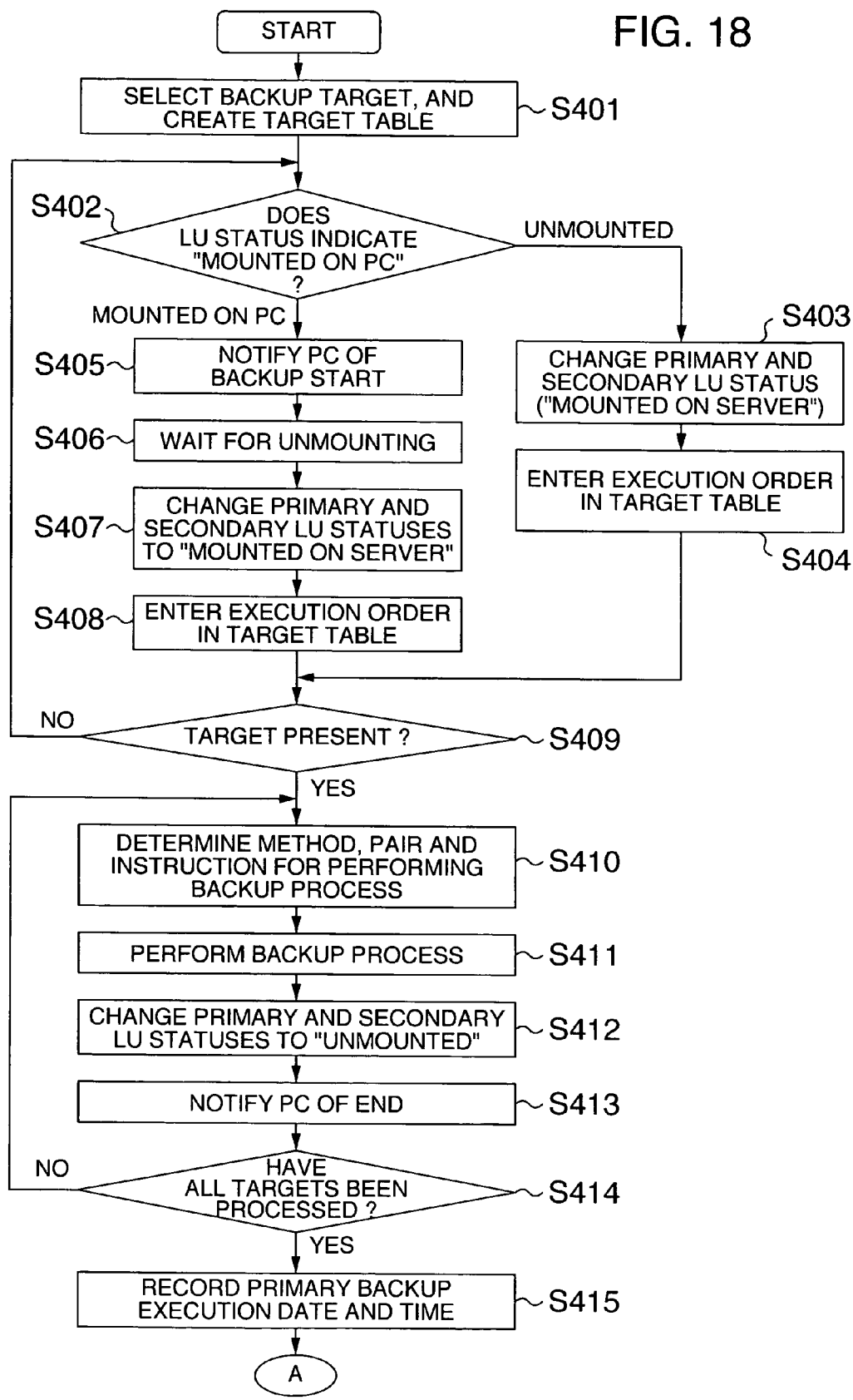
FIG. 18 is a flowchart showing the primary backup processing performed by the computer, the backup management server and the storage device according to the second embodiment when the LU are mounted.

FIG. 18 is a flowchart showing the processing routine during which the backup managing module 215 performs the backup service for the LU 600 at a designated date and time. The backup managing module 215 starts a backup service at the time set by a manager.

The backup managing module 215 examines the frequency of the primary process 1402 and the primary process date and time 1406 in the group schedule management table 1400 to identify a group to perform a primary backup process. For example, when, for a specific group, the frequency of the primary process 1402 in the group schedule management table 1400 is once every two days and the date under the primary processing date and time 1406 is one day before, the backup process will not be performed for this group. Further, when the frequency of the primary process 1402 for another group is once every two days and the date under the primary processing date and time 1406 is two days before, the backup process is to be performed. Then, targets 310 that belong to a group for which the backup process is to be performed are selected from the group management table 1300, and one of the targets is defined as a backup target and the pertinent target ID 1301 is registered in the target table 2200 in FIG. 22 (S401).

Following this, the backup managing module 215 identifies the primary status 6004 of the target by using the mounted status management table 6000. When the primary LU status 6004 indicates "unmounted", program control is shifted to Step S403, or when the primary LU status 6004 indicates "mounted on a PC", program control advances to Step S405 (S402).

When the primary LU status 6004 indicates "unmounted" at Step S402, the backup managing module 215 changes the primary and the secondary LU statuses to "mounted on a server" (S403).

Sequentially, the backup managing module 215 provides an execution turn for the target 310 registered in the target table 2200 (S404). When there are a plurality of groups available to provide a backup service, priority is given to a group that includes many targets for which the primary LU status is "unmounted".

When the primary LU status 6004 indicates "mounted on a PC" at Step S402, a backup start notification is transmitted to the computer 100 whereon the LU is mounted (S405). The processing performed by the client program 112 that has received the backup start notification will be described later while referring to FIG. 20.

Since the client program 112 that has received the backup start notification unmounts the LU, the backup managing module 215 waits until the primary LU status 6004 in the mounted status management table 6000 is changed to "unmounted" (S406).

When the primary LU status 6004 in the mounted status management table 6000 is set to "unmounted", the backup managing module 215 changes the primary and secondary LU statuses to "mounted on a server" (S407).

Following this, the backup managing module 215 provides an execution turn for the target 310 registered in the target table 2200 (S408).

The backup managing module 215 examines the target table 2200 to determine whether the target 310 is present. When the target 310 for providing a backup service has not yet been registered in the target table 2200, program control returns to Step S401 and a target 310 is selected to perform a backup process. When the target 310 for providing a backup service is present in the target table 2200, program control advances to Step S410 (S409).

The backup managing module 215 refers to the pair management table 8000, and determines a backup method, primary and secondary LU numbers, a copy instruction type and a storage device 300 to which the copy instruction is to be transmitted (S410).

Sequentially, the backup managing module 215 boots the copy management program 212 by employing, as input arguments, a device ID, the backup method, the copy instruction and the primary LU number and the secondary LU number, and performs a backup process. At Step S411, the copy management program 212 accesses the management target 320 consonant with the device ID, and transmits the backup method, the copy instruction, the primary LU number and the secondary LU number to the copy program 413 for the storage device 300, and the copy program 413 initiates a copy process.

The backup end monitoring module 216 performs monitoring to determine whether the execution of the copy instruction has ended. When a notification indicating the copy process has ended is received from the copy program 413, the copy management program 212 transmits a write block cache instruction to the copy program 413 and ends the backup process. When the backup end notification is received, the backup end monitoring module 216 changes the primary and secondary LU statuses 6004 and 6005 in the mounted status management table 6000 to "unmounted" (S412).

Furthermore, when an IP address is present under the PC information 6006 in the mounted status management table 6000, the backup end monitoring module 216 transmits to the computer 1000 a backup end notification consonant with the IP address (S413).

The backup end monitoring module 216 determines whether the primary backup process has been completed for all the targets 310 in the target table 2200. When there is a target 310 in the target table 2200 for which the primary backup process has not yet been performed, program control returns to Step S410 and the backup process is continued. When the primary backup process has been completed for all the targets 310 entered in the target table 2200, program control advances to Step S415 (S414).

The backup end monitoring module 216 enters, in the primary process date and time 1406 for the group schedule management table 1400, the date and time whereat the primary backup process was performed. Thereafter, the primary backup process is completed (S415).

Figure 19:
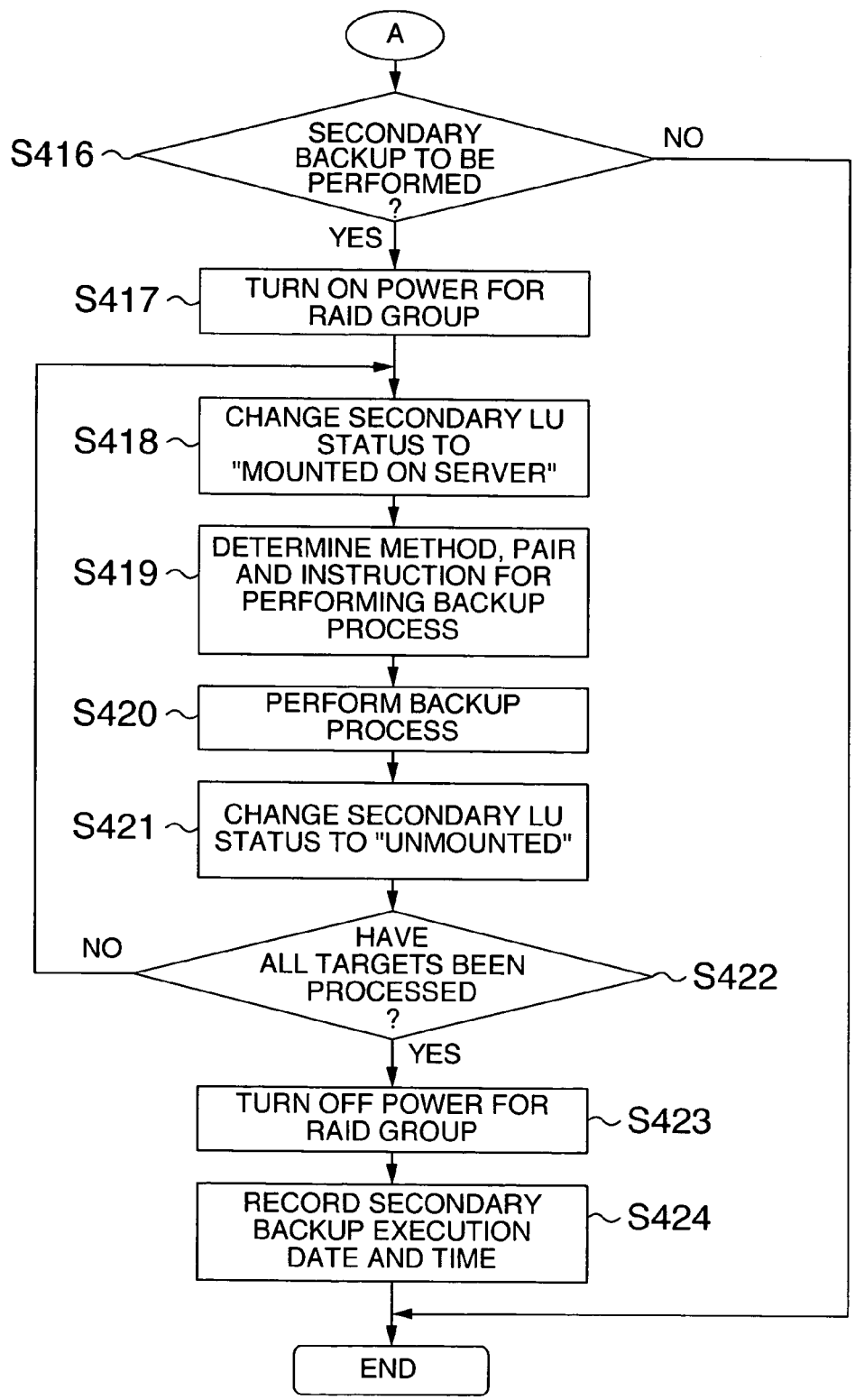
FIG. 19 is a flowchart showing the secondary backup processing performed by the computer, the backup management server and the storage device according to the second embodiment when the LU are mounted.

The secondary backup process will now be described while referring to FIG. 19. The secondary backup process is performed by the secondary backup managing module 217.

The secondary backup managing module 217 examines the performance frequency for the secondary process 1403 and the secondary process date and time 1407 in the group schedule management table 1400, and determines whether the secondary backup process should be performed. For example, for a specific group, when the performance frequency for the secondary process 1403 in the group schedule management table 1400 is once a week and the date under the secondary process date and time 1407 is three days before, the secondary backup process is not performed for this group. Further, for another group, when the performance frequency for the secondary process 1403 in the group schedule management table 1400 is once a week, and the date under the secondary process date and time 1407 is seven days before, the secondary backup process is to be performed for this group. When the secondary backup process need not be performed, this processing is terminated. But when the secondary backup process is to be performed, program control advances to Step S417 (S416).

To perform the secondary backup process, the secondary backup managing module 217 turns the power on for the RAID group of a copy destination storage device 300. When a storage device 300 is not a power-controllable type, however, the power activation process at this step need not be performed (S417).

Next, the second backup managing module 217 changes the secondary LU status 6005 in the mounted status management table 6000 to "mounted on a server" (S418).

The remote pair management table 1500 is employed to determine the secondary LU number, the LU number at a copy destination, a copy instruction type and a storage device 300 to which the copy instruction is to be transmitted (S419).

Sequentially, the secondary backup managing module 217 boots the copy management program 212 by employing, as input arguments, a device ID, a backup method, the copy instruction, a primary LU number and a secondary LU number, and performs the backup process. At Step S420, the copy management program 212 accesses a management target 320 consonant with the device ID, and transmits the backup method, the copy instruction, the primary LU number and the LU number to the copy program 413 of the storage device 300, and the copy program 413 performs a copy process.

After the secondary backup process has been completed, the second backup managing module 217 changes the secondary LU status 6005 in the mounted status management table 6000 to "unmounted" (S421).

The backup end monitoring module 216 determines whether the secondary backup process has been performed for all the targets 310 entered in the target table 2200. When there is a target 310 in the target table 2200 for which the secondary backup process has not yet been performed, program control returns to Step S418 and the secondary backup process is continued. When the secondary backup process has been completed for all the targets 310 entered in the target table 2200, program control advances to Step S423 (S422).

When the secondary backup process has been performed for all the targets 310 in the target table 2200, the secondary backup managing module 217 turns off the power for the RAID group of the copy destination storage device 300. When the storage device is not a power-controllable type, however, the power halting process at this step need not be performed (S423).

Following this, the secondary backup managing module 217 enters the current date and time in the secondary process date and time 1407 for the group schedule management table 1400 (S424). The processing is thereafter terminated.

Figures 20, 22:
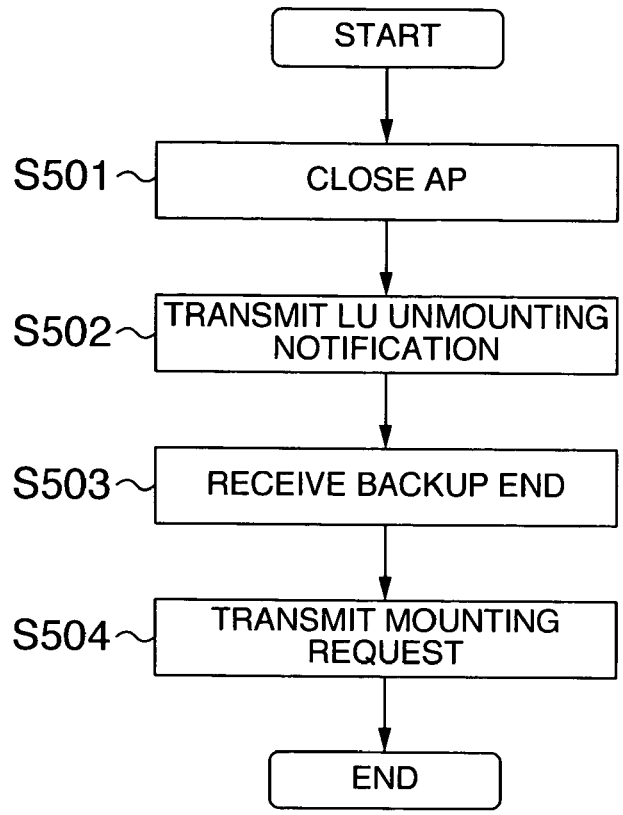
FIG. 20 is a flowchart showing the processing performed by the computer, the backup management server and the storage device according to the second embodiment when a notification for the start and end of the backup processing is received.
FIG. 22 is a diagram showing an example table for targets for a backup according to the second embodiment.

While referring to FIG. 20, explanation will be given for the unmounting and mounting processing that is performed when the computer 100 has already mounted and is using the LU 600 when the backup management server 200 starts the primary backup process. In this case, as previously explained at Step S405 in FIG. 18, the backup managing module 215 transmits a backup start notification to the computer 100. When the backup start monitoring module 116 of the client program 112 receives this notification, the processing is initiated.

The backup start monitoring module 116 outputs to the CRT of the computer 100 a message representing a backup start, in order to provide this information for a user. Then, the backup start monitoring module 116 closes all the applications that use files stored in the LU 600 (S501).

Next, the unmounting module 113 is booted to unmount the LU 600, and the unmounted status of the LU is transmitted to the server program 213 (S502).

When the primary backup process performed by the backup management server 200 has been completed, the server program 213 transits a backup end notification. The backup end monitoring module 115 receives the backup end notification, and provides this notification for the user (S503).

Upon receiving the backup end notification, the user boots the mounting module 114 to again mount the LU 600 (S504).

Through the above described unmounting and mounting processing, according to the second embodiment, based on a designated schedule, a backup process can be started while a computer 100 is using an LU 600. Further, when the backup process has ended, the computer 100 can again employ the LU 600.

<File Restoration Processing>

An overview of the file restoration processing will now be described. As explained while referring to FIG. 5, the computer 100 can mount and employ an LU 600 that is mapped onto a target 310. Generally, only a primary LU 330 is mapped onto a target 310. But in accordance with the backup system of this embodiment, when a restoration request is issued by a user, a secondary LU 340 can be mapped onto a target 310, so that the user can mount the secondary LU 340 on a computer 100 and use it. When the secondary LU 340 can be mounted on the computer 100, the user can perform the restoration process for each file, and the files can be copied from the secondary LU 340 to the primary LU 330. Release of the mapping for the secondary LU 340 is performed when the target 310 is unmounted to provide a condition wherein, when the mounting process is performed the next time, only the primary LU 330 is mapped onto the target 310.

An overview of the restoration processing will now be explained while referring to FIG. 21.

A user boots the restoration execution module 117 of the client program 112 to start the restoration processing.

The restoration execution module 117 transmits a restoration request to the LU mounted status managing module 214 of the server program 213 (S601).

The LU mounted status managing module 214 examines the owner information 6002 for the mounted status management table 6000, and determines whether user identification information (CHAP-ID in this embodiment) included in the restoration request has been registered under the owner information 6002 in the mounted status management table 6000. When the identification information has not been not registered, the processing is terminated. But when the identification information is present, a target 310 that is consonant with the user is identified (S602).

Sequentially, the LU mounted status managing module 214 examines the secondary LU status 6005 in the mounted status management table 6000 to identify the secondary LU status of the target 310. When the secondary LU status 6005 indicates "mounted on a server", program control is shifted to Step S613, or when the secondary LU status 6005 indicates "unmounted", program control advances to Step S604 (S603).

When the secondary LU status 6005 for the target 310 indicates "mounted on a server" at Step S603, it is assumed that the secondary backup process is currently being performed for the secondary LU 340 of the target 310, and the LU mounted status managing module 214 notifies the restoration execution module 117 that the backup process is currently being performed. Thereafter, the restoration execution module 117 displays on the CRT of the computer 100 a notification that the backup process is currently being performed for the secondary LU. The processing is thereafter terminated (S613).

When the secondary LU status 6005 of the target 310 indicates "unmounted", the secondary LU status 6005 of the target 310 is changed to "mounted on a PC". Further, the LU mounted status managing module 214 requests that the restoration managing module 218 perform the LU mapping process (S604).

The restoration managing module 218 obtains the secondary LU number and a device ID by referring to the pair management table 8000, and obtains a target number by referring to the mounted status management table 6000. Then, the restoration managing module 218 boots the storage management program 211 by employing, as input arguments, the device ID (the address of the management I/F 405 in this case), the target name, the secondary LU number and an LU mapping instruction, and maps the secondary LU onto the primary LU target. The storage management program 211 then transmits an LU map change instruction to the configuration management program 412, via the management I/F 405, designated by the device ID (S605).

After the configuration management program 412 has changed the LU map, the restoration managing module 218 transmits a mapping completed notification to the restoration execution module 117. Upon receiving the mapping completed notification, the restoration execution module 117 of the client program 112 displays the mapping completion notification on the CRT of the computer 100 for the user. The processing is thereafter terminated (S606).

The user again accesses the target 310 through the computer 100 and mounts the secondary LU 340 (S607).

A file to be restored is copied from the secondary LU 340 to the primary LU 330, i.e., the restoration processing is performed (S608).

When the restoration processing has been completed, the user boots the unmounting module 113 to unmount the secondary LU 340 of the target 310 (S609).

Upon receiving the LU unmounting notification, the LU mounted status managing module 214 of the server program 213 examines the owner information 6002 in the mounted status management table 6000 to determine whether identification information (CHAP-ID in this embodiment) for a user, indicated in the unmounting notification, is present under the owner information 6002 in the mounted status management table 6000. When the identification information has not yet been registered, the processing is terminated. But when the identification information has already been registered, a target 310 that is consonant with the user is identified (S610).

The LU mounted status managing module 214 examines the primary and secondary LU statuses of the target 310. When the restoration processing has been performed, the secondary LU status indicates "mounted on a PC". Thus, the LU mounted status managing module 214 requests that the restoration managing module 218 perform the LU unmapping process to change the mapping of the target 310 and the secondary LU 340 (unmapping).

The restoration managing module 218 obtains the secondary LU number and a device ID by referring to the pair management table 8000, and then obtains a target name by referring to the mounted status management table 6000. The restoration managing module 218 boots the storage management program 211 by employing, as input arguments, the device ID (the address of the management I/F 405), the target name, the secondary LU number and the LU map change instruction, and unmaps the secondary LU 340 from the target 310 for the primary LU 330 (S611).

After unmapping has been completed, the restoration managing module 218 changes the primary and secondary LU statuses 6004 and 6005 in the mounted status management table 6000 to "unmounted" (S612). The processing is thereafter terminated.

Through the above explanation, according to the second embodiment, the backup process can be performed, based on a designated schedule, after the computer 100 has mounted the LU and is using it. Further, by performing the backup process in two phases, data can be saved by doubling the number of data backups that are acquired. Furthermore, since the secondary LU, which is the copy destination for the secondary backup, is managed for each RAID group, the ON/OFF state of the power can be controlled in consonance with the RAID group, and a power saving system can be provided.

<First Modification>

Explanation will be given for a first modification of the first and second embodiments wherein the computer 100 is a diskless computer that does not include a storage device, such as a hard disk drive, for holding data. According to the first modification, the computer 100 includes a network boot program (hereinafter referred to as an "NBP"). The NBP accesses the LU 600 in the storage device 300 and activates the OS stored in the LU 600 to perform the mounting process. In the first modification, a mounting module 114 is mounted on the NBP.

In the second embodiment, when a backup process is started while the LU 600 is mounted on the computer 100, the backup start notification is transmitted to the backup start monitoring module 116. However, when a diskless computer is employed as the computer 100, the LU 600 can not be unmounted, because then, the processing performed by the OS would be halted. In the first modification, when during the backup process a write request is issued to a block corresponding to the LU 600, the backup start monitoring module 116 holds the write data in the cache memory 406 of the storage device 300, and when the backup process has ended, writes the write data stored in the cache memory 406 to the LU 600.

According to the first modification, in a computer system wherein the OS is read from the storage device 300 and executed by the computer 100, the backup management server 200 can also perform the backup process.

<Second Modification>

Explanation will now be given for a second modification, for the first and the second embodiments, wherein the restoration processing is performed for each LU, instead of for each file.

The restoration processing for each LU is performed, for example, when a disk corresponding to the primary LU 330 is physically destroyed and the computer 100 can not mount this LU 330, or when the mounting of the primary LU 330 is enabled but a file system has been destroyed and a file has been lost. The restoration process according to the second embodiment is performed as follows.

First, in order not to propagate the destruction of the primary LU 330 to the secondary LU 340, a manager detects the destruction of the primary LU 330, and halts the backup process. Then, data included in the secondary LU 340 are copied to another primary LU 330.

Specifically, the event detector of the storage device 300 is employed to detect the destruction of a disk for the primary LU 330, and the manager receives an event via email. The manager then changes the primary and secondary LU statuses 6004 and 6005 in the mounted status management table 6000 to "mounting inhibited", and inhibits both the mounting process and the backup process relative to the primary LU 330 and the secondary LU 340. Further, the manager employs the configuration management program 412 to create, in the storage device 300, an LU 600 that serves as a new primary LU 330. Further, the manager employs the copy program 413 to synchronize the secondary LU 340 with the new primary LU 330, and to copy data included in the secondary LU 340 to the primary LU 330. Sequentially, the primary LU number 8003 in the pair management table 8000 is re-registered, and the primary and secondary LU statuses 6004 and 6005 in the mounted status management table 6000 are changed to "unmounted". The restoration process is thereafter terminated. The processing sequence performed upon receiving an event can also be automated by using a program.

The file system destruction of the primary LU 330 can also be detected by providing, for the mounting module 114 of the client program 122, a function for detecting an event transmitted by the OS. The mounting module 114 that has detected the destruction displays a message on the CRT to notify a user that the destruction has occurred. The user designates the restoration process for each LU, and boots the restoration execution module 117. The restoration execution module 117 transmits to the server program 213 a request for the restoration of each LU. The LU mounted status managing module 214 of the server program 213 sets to "mounting inhibited" the primary and secondary LU statuses 6004 and 6005 in the mounted status management table 6000. Thus, since the backup process is not performed, propagation to the secondary LU 340 of the file destruction can be prevented.

Next, the restoration execution module 117 starts the unmounting module 113 to unmount an LU 600 that serves as a new primary LU 330. The LU mounted status managing module 214 receives an unmounting notification, and since the primary and secondary LU statuses indicate "unmounted", transmits a notification for the process without changing the statuses.

The user enters a request for the manager to perform restoration processing for the LU 600. The manager employs the copy program 413 to synchronize the secondary LU 340 with the new primary LU 330, and copies data included in the secondary LU 340 to the primary LU 330. Furthermore, the primary and secondary LU statuses in the mounted status management table 6000 are changed to "unmounted", and the restoration processing is thereafter terminated.

According to the second modification, for example, when a disk consonant with the primary LU is destroyed, the restoration process can be performed by using data stored, for each LU, in the secondary LU, instead performing the restoration process for each file.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A computer system comprising:
  a storage system;
  a computer connected to the storage; and
  a backup management server connected to the storage system and the computer;
  wherein the storage system includes:
  a plurality of first storage areas, for storing data used by a plurality of different computers, other than said computer, connected to the storage system via a network; and
  a plurality of second storage areas, for storing duplicate data obtained by copying the data stored in the plurality of first storage areas, and
  wherein the backup management server, includes a mounted status managing module which manages the statuses of the first and second storage areas by using a group management table, for managing the plurality of first and second storage areas in correlation with groups and target information mapping the first storage units to the computer and the different computers, and wherein the backup management server further includes a backup managing module which performs backups between the first and second storage areas by using a frequency management table, for managing time information, indicating duplication of data included in the first storage areas of the groups that are to be prepared, and a preparation frequency for the duplication of data and by using a target management table in which the specific first storage area is entered that is the target for the preparation of the duplicate; and
  wherein the storage device further includes:
  a controller, for employing the time information, which indicates a time at which to prepare a duplicate of data included in the first storage areas, under the groups in the frequency management table, to determine a specific group, among the plurality of the first storage areas, that is a target for the preparation of the duplicate, to determine an opportunity for preparing duplicate data in a specific first storage area of the first storage areas included in the specific group, to transmit an unmounting request to a specific different computer of the different computers that employ the specific first storage area, and to, when the specific first storage area is unmounted from the specific different computer, mount the specific first storage area on the computer, copy data in the specific first storage area, and store the thus obtained duplicate data in one of the plurality of second storage areas, and
  wherein, when the controller employs the frequency management table to determine the specific group, among the plurality of first storage areas, that is the target for the preparation of the duplicate, the controller registers in the target management table the plurality of first storage areas included in the specific group, and prepares a duplicate for the specific first storage area entered in the target management table,
  wherein primary and secondary time information, for preparing duplicates of data included in the first storage areas in the specific group, and frequencies, for preparing data duplicates, are entered in the frequency management table, and
  wherein, when the copying of data included in the first storage areas, in the specific group, under the primary time information has ended, the controller determines whether data included in the first storage areas, in the specific group, under the secondary time information is to be copied,
  wherein, when data included in the first storage areas, in the specific group, under the secondary time information is to be copied, the controller designates a plurality of second storage areas that correspond to the plurality of first storage areas, included in the specific group, and copies the data, and
  wherein, in a case wherein the controller copies data included in the first storage areas, in the specific group, under the secondary time information into the plurality of second storage areas that correspond to the plurality of first storage areas, included in the specific group, the controller includes means for turning on power for the plurality of second storage areas, when it has been determined that back up copying from the first storage areas to the second storage areas is to be performed, means for changing a status of the second storage areas to "mounted" after the power is turned on, means for determining methods, pairs and instructions for performing the copying from the first storage areas to the corresponding second storage areas, after the status of the second storage areas has been changed to "mounted," means for copying the data from the first storage areas to the corresponding second storage areas, means for changing the status of the second storage areas to "unmounted", after copying to them has been completed, and means for turning off power to the second storage areas when it has been determined that all copying to the second storage areas from the corresponding first storage areas has been completed.

2. The computer system according to claim 1,
wherein the controller provides, for the plurality of storage areas included in the groups, priority ranks in ascending order, beginning with the first storage areas the statuses of which indicate "unmounted", and registers the first storage areas with the priority ranks.

3. A computer system comprising:
a first storage system;
a second storage system;
a computer connected to the first and the second storage systems, and
a backup management server connected to the first and second storage systems and the computer,
wherein the first storage system includes:
a plurality of first storage areas, for storing data used by a plurality of different computers, other than the computer, that are connected to the first storage system via a network,
wherein the second storage system includes
a plurality of second storage areas, for storing duplicate data prepared by copying data in the plurality of first storage areas, and
wherein the backup management server includes a mounted status managing module which manages the statuses of the first and second storage areas by using a group management table, for managing the plurality of first and second storage areas in correlation with groups and target information mapping the first storage units to the computer and the different computers, and wherein the backup management server further includes a backup managing module which performs backups between the first and second storage areas by using a frequency management table, for managing time information indicating duplicate data, included in the first storage areas of the groups, that are to be prepared, and a frequency for preparing the duplicate data and by using a target management table in which the specific first storage area is entered that is the target for the preparation of the duplicate; and
wherein the storage device further includes:
a controller, for employing the frequency management table to determine for which specific group, from among the plurality of first storage areas included in the first storage system, the duplicate data is to be prepared, for determining an opportunity for preparing duplicate data in a specific first storage area of the plurality of first storage areas included in the specific group, for transmitting an unmounting request to a specific different computer, of the plurality of different computers that employ the specific first storage area, and for, when the specific first storage area is unmounted from the specific different computer, mounting the specific first storage area, copying data in the specific first storage area, and storing duplicate data thus obtained in one of the plurality of second storage areas in the second storage system and,
wherein, when the controller employs the frequency management table to determine the specific group, among the plurality of first storage areas, that is the target for the preparation of the duplicate, the controller registers in the target management table the plurality of first storage areas included in the specific group, and prepares a duplicate for the specific first storage area entered in the target management table, and
wherein, when the controller employs the frequency management table to determine the specific group, among the plurality of first storage areas, that is the target for the preparation of the duplicate, the controller registers in the target management table the plurality of first storage areas included in the specific group, and prepares a duplicate for the specific first storage area entered in the target management table,
wherein primary and secondary time information, for preparing duplicates of data included in the first storage areas in the specific group, and frequencies, for preparing data duplicates, are entered in the frequency management table, and
wherein, when the copying of data included in the first storage areas, in the specific group, under the primary time information has ended, the controller determines whether data included in the first storage areas, in the specific group, under the secondary time information is to be copied,
wherein, when data included in the first storage areas, in the specific group, under the secondary time information is to be copied, the controller designates a plurality of second storage areas that correspond to the plurality of first storage areas, included in the specific group, and copies the data, and
wherein, in a case wherein the controller copies data included in the first storage areas, in the specific group, under the secondary time information into the plurality of second storage areas that correspond to the plurality of first storage areas, included in the specific group, the controller includes means for turning on power for the plurality of second storage areas, when it has been determined that back up copying from the first storage areas to the second storage areas is to be performed, means for changing a status of the second storage areas to "mounted" after the power is turned on, means for determining methods, pairs and instructions for performing the copying from the first storage areas to the corresponding second storage areas, after the status of the second storage areas has been changed to "mounted, "means for copying the data from the first storage areas to the corresponding second storage areas, means for changing the status of the second storage areas to "unmounted", after copying to them has been completed, and means for turning off power to the second storage areas when it has been determined that all copying to the second storage areas from the corresponding first storage areas has been completed.

4. The computer system according to claim 3,
wherein the controller provides, for the plurality of storage areas included in the groups, priority ranks in ascending order, beginning with the first storage areas the statuses of which indicate "unmounted", and registers the first storage areas with the priority ranks.

5. The computer system according to claim 3,
wherein, when data included in the first storage areas, in the specific group, under the secondary time information is not to be copied, the controller transmits to the specific different computer that employs the specific first storage area a notification indicating the copying has ended.

6. The computer system according to claim 3,
wherein, when the controller copies data included in the first storage areas, in the specific group, under the second time information, the plurality of second storage areas that correspond to the plurality of first areas included in the specific group are RAID groups.

* * * * *